(12) United States Patent
Inaguma et al.

(10) Patent No.: US 10,378,412 B2
(45) Date of Patent: Aug. 13, 2019

(54) METAL SUBSTRATE FOR CATALYTIC CONVERTER AND CATALYST CARRIER

(71) Applicant: NIPPON STEEL & SUMIKIN MATERIALS CO., LTD., Tokyo (JP)

(72) Inventors: Tooru Inaguma, Tokyo (JP); Shinji Kawasoe, Tokyo (JP); Yasuhiro Tsumura, Tokyo (JP); Shogo Konya, Tokyo (JP); Masayuki Kasuya, Tokyo (JP); Takuzo Kako, Tokyo (JP); Masafumi Omizu, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 16/084,666

(22) PCT Filed: Oct. 11, 2017

(86) PCT No.: PCT/JP2017/036752
§ 371 (c)(1),
(2) Date: Sep. 13, 2018

(87) PCT Pub. No.: WO2018/159007
PCT Pub. Date: Sep. 7, 2018

(65) Prior Publication Data
US 2019/0078489 A1    Mar. 14, 2019

(30) Foreign Application Priority Data
Feb. 28, 2017 (JP) .................................. 2017-036612

(51) Int. Cl.
*F01N 3/28* (2006.01)
*B01J 35/04* (2006.01)
(Continued)

(52) U.S. Cl.
CPC ............ *F01N 3/2814* (2013.01); *B01J 32/00* (2013.01); *B01J 35/04* (2013.01); *F01N 3/20* (2013.01);
(Continued)

(58) Field of Classification Search
CPC ............. F01N 2330/04; F01N 2330/42; F01N 3/2814; B01J 32/00; B01J 35/04
(Continued)

(56) References Cited

U.S. PATENT DOCUMENTS 4,318,828 A * 3/1982 Chapman ........... B01D 53/9454
148/284
4,588,449 A * 5/1986 Sigler ....................... C23C 8/10
148/285
(Continued)

FOREIGN PATENT DOCUMENTS

EP 3 360 612 A1 8/2018
JP H09-201537 A 8/1997
(Continued)

OTHER PUBLICATIONS

PCT International Search Report of PCT/JP2017/036752 "PCT/ISA/210" dated Jan. 16, 2018.
(Continued)

*Primary Examiner* — Tom P Duong
(74) *Attorney, Agent, or Firm* — Manabu Kanesaka

(57) ABSTRACT

A metal substrate for catalytic converter for purifying an exhaust gas includes a honeycomb core with metal flat foil and corrugated foil stacked in layers, and an oxide film having a thickness of 0.1 μm or more and 10 μm or less is formed in a predetermined range including an exposed end surface exposed toward the gas inlet side. The oxide film contains at least a first alumina including α-alumina and a Fe oxide. The α-alumina contains α-alumina with solid-solved Fe and α-alumina with no solid-solved Fe. In the oxide film, the content of the first alumina is 30% by mass or more and 99.5% by mass or less, the content of the Fe oxide is 0.5% by mass or more and 40% by mass or less, and the content of Fe is more than 7% by mass and 35% by mass or less.

20 Claims, 5 Drawing Sheets

(51) Int. Cl.
  *B01J 32/00* (2006.01)
  *F01N 3/20* (2006.01)
  *B01J 23/745* (2006.01)
  *B01J 21/04* (2006.01)

(52) U.S. Cl.
  CPC ............ *F01N 3/2882* (2013.01); *B01J 21/04* (2013.01); *B01J 23/745* (2013.01); *F01N 2330/04* (2013.01); *F01N 2330/42* (2013.01)

(58) Field of Classification Search
  USPC .................. 422/177, 180; 502/212, 304, 240
  See application file for complete search history.

(56) References Cited

U.S. PATENT DOCUMENTS

| | | | | |
|---|---|---|---|---|
| 4,678,770 A | * | 7/1987 | Wan | B01D 53/945 423/213.5 |
| 4,727,052 A | * | 2/1988 | Wan | B01D 53/945 502/304 |
| 4,900,712 A | * | 2/1990 | Bar-Ilan | B01J 37/0221 423/213.5 |
| 5,334,570 A | * | 8/1994 | Beauseigneur | B01J 23/40 502/240 |
| 6,087,298 A | * | 7/2000 | Sung | B01D 53/945 502/333 |
| 2002/0132730 A1 | * | 9/2002 | Hwang | 19/4 |
| 2018/0258816 A1 | | 9/2018 | Inaguma et al. | |

FOREIGN PATENT DOCUMENTS

| | | |
|---|---|---|
| JP | H11-216368 A | 8/1999 |
| JP | 2006-223925 A | 8/2006 |
| JP | 2007-14831 A | 1/2007 |
| JP | 2007-203256 A | 8/2007 |
| JP | 2008-264596 A | 11/2008 |
| WO | 2017/061439 A1 | 4/2017 |

OTHER PUBLICATIONS

PCT Opinion of PCT/JP2017/036752 "PCT/ISA/237" in Japanese dated Jan. 16, 2018.

* cited by examiner

DIRECTION OF EXHAUST GAS CONDUCTION (AXIAL DIRECTION)

DIRECTION OF EXHAUST GAS CONDUCTION (AXIAL DIRECTION)

DIRECTION OF EXHAUST GAS CONDUCTION (AXIAL DIRECTION)

DIRECTION OF EXHAUST GAS CONDUCTION (AXIAL DIRECTION)

DIRECTION OF EXHAUST GAS CONDUCTION (AXIAL DIRECTION)

METAL SUBSTRATE FOR CATALYTIC CONVERTER AND CATALYST CARRIER

RELATED APPLICATIONS

The present application is National Phase of International Application No. PCT/JP2017/036752 filed Oct. 11, 2017, and claims priority from Japanese Application No. 2017-036612, filed Feb. 28, 2017, the disclosure of which is hereby incorporated by reference herein in its entirety.

TECHNICAL FIELD

The present invention relates to a metal substrate for catalytic converter to be used for purifying an exhaust gas, and the like.

BACKGROUND ART

As one of devices for converting NOx contained in a diesel exhaust gas into harmless substances, urea selective catalytic reduction (hereafter, abbreviated as SCR) has been brought into practical use.

The SCR allows a urea solution injected through the inlet side of an SCR reactor to undergo hydrolysis with heat provided by an exhaust gas and thereby produce ammonia. Then, with an SCR catalyst in the SCR reactor, the nitrogen oxide (NOx) in the exhaust gas and ammonia are subjected to the reduction reaction to be converted to nitrogen and water and thereby made harmless.

Furthermore, a diesel particulate filter (DPF) for capturing a diesel particulate matter (hereafter referred to as the PM) and a diesel oxidation catalyst (DOC) for oxidizing unburned fuel are connected to the upstream of the SCR. The temperature of an exhaust gas passing through the SCR reactor varies in a wide range from 200° C. at the time of low load (for example, at the time of starting the engine) to 600° C. at the time of DPF regeneration.

Here, in recent years, it has been studied to apply a catalyst carrier having a honeycomb structure which carries a catalyst to the SCR, DOC, and the like. Such a catalyst carrier for purifying an exhaust gas is known (for example, see Patent Literature 1) in which a roll-shaped honeycomb structure wound around in layers with strip-shaped metal corrugated foil and flat foil is inserted into an outer jacket, and a catalyst substance is caused to adhere to the corrugated foil and the flat foil. In the catalyst carrier, the corrugated foil is provided with a number of fins having different phases between adjacent ones in the axial direction of winding (i.e., an offset structure).

CITATION LIST

Patent literature

Patent Literature 1: JP4719180
Patent Literature 2: JP2007-14831
Patent Literature 3: JP2007-203256

SUMMARY OF INVENTION

Technical Problem

The inventors have conducted an exhaust gas purification test by applying a catalyst carrier having the aforementioned offset structure to the SCR and the DOC and found that an end surface on the gas inlet side of each fin was chipped. Since an exhaust gas flowing into the DOC contains a PM, the exhaust gas containing the PM is considered to collide with the end surface on the gas inlet side of each fin, thereby impairing or stripping the catalyst and causing the wind erosion region to extend from this defect portion. On the other hand, in the case of the SCR, it is considered that the ammonia having undergone hydrolysis may contain a solid matter derived from urea. An exhaust gas containing that solid matter collides with the end surface on the inlet side of a fin, thereby impairing or stripping the catalyst and causing the wind erosion region to extend from this defect portion.

An exhaust gas from a vehicle that produces traveling energy by the combustion of gasoline may also contain particles. Even when a catalyst carrier having the aforementioned offset structure is applied to a purification device for purifying the exhaust gas, the aforementioned wind erosion becomes problematic.

In the case of a catalyst carrier having an offset structure, all the end surfaces on the inlet side of a number of fins are subjected to wind erosion. Thus, as compared with a case where no offset structure is provided, the catalyst carrier deteriorates at an early stage. Furthermore, even in the case of a catalyst carrier provided with no offset structure, it is concerned that deterioration due to wind erosion may become problematic because the end surfaces on the inlet side of the catalyst carrier are also subjected to wind erosion.

Here, a catalytic converter for purifying an exhaust gas is disclosed in Patent Literature 2, in which the catalytic converter has an outstanding high-temperature oxidation resistance and having a catalyst layer formed in a metal honeycomb substrate made of a processed stainless foil. The catalytic converter is characterized in that pieces of stainless foil are bonded by diffusion bonding; precursor film is formed on the surface of the stainless foil; the precursor film is made from an oxide; the oxide contains at least one or more types of alumina among $\alpha$, $\gamma$, $\theta$, $\chi$, $\delta$, $\eta$, and $\kappa$ aluminas according to the classification by the crystalline structure; and the catalyst layer contains an alkali metal component.

However, Patent Literature 2 addresses the problem that the high-temperature oxidation resistance of the stainless foil is degraded and the durability of the substrate is degraded at high temperatures when a catalyst promoter containing an alkali metal component is carried in the catalyst layer. No consideration is thus given to the aforementioned wind erosion.

Furthermore, a catalytic converter for purifying an exhaust gas is disclosed in Patent Literature 3, in which the catalytic converter is constituted by a metal honeycomb substrate made of a processed stainless foil and a catalyst layer formed on the stainless foil. The catalytic converter is characterized in that the stainless foil contains at least Fe, Cr, and Al; the surface of the stainless foil has an oxide film made by a stainless foil component being oxidized; and the concentration of Fe contained in the oxide film is 0.1% by mass or more and 7% by mass or less relative to the oxide. Furthermore, the concentration of Fe as well as $\alpha$-alumina and $\gamma$ alumina as an oxide film is disclosed in Table 1 to Table 3 of Patent Literature 3. This means that the concentration of Fe that is solid-solved in $\alpha$-alumina and $\gamma$ alumina is disclosed in Patent Literature 3.

However, Patent Literature 3 addresses the problem of reducing deterioration of a catalyst layer due to heat when a catalytic converter for purifying an exhaust gas is used in an environment at a temperature exceeding 900° C. Thus, like Patent Literature 2, no consideration is given to the wind erosion. Furthermore, in Patent Literature 3, the upper limit of Fe concentration is restricted to 7%, and when the Fe concentration exceeds 7%, Fe moving to the catalyst layer abruptly increases, causing significant deterioration in the purification performance. On the other hand, since Fe is required to improve the toughness of the oxide film and enhance the wind erosion resistance, it is desirable to increase the content thereof within the range which may not accelerate the deterioration of the purification performance.

In this context, it is an object of the present invention to provide a catalyst carrier which protects each end surface on the gas inlet side provided in the catalyst carrier from wind erosion and which is provided with an oxide film that is capable of preventing Fe from moving to the catalyst layer.

Solution to Problem

The inventors have intensively studied the aforementioned problem and found that the wind erosion resistance could be satisfied by covering the end surface on the inlet side of the catalyst carrier with an oxide film which is rich in α-alumina and in which the Fe concentration is increased to exceed 7% by mass. On the other hand, when the Fe concentration exceeds 7% by mass, it is concerned that Fe moving to the catalyst layer abruptly increases and deterioration in the purification performance becomes problematic. In this context, it was found to contain Fe oxide in the oxide film in conjunction with α-alumina.

More specifically, a metal substrate for catalytic converter according to the present invention is (1) a metal substrate for catalytic converter for purifying an exhaust gas, including a honeycomb core with metal flat foil and corrugated foil stacked in layers. The metal substrate for catalytic converter is characterized in that an oxide film having a thickness of 0.1 μm or more and 10 μm or less is formed in a predetermined range including an exposed end surface exposed toward a gas inlet side; the oxide film contains at least a first alumina comprising α-alumina and a Fe oxide; the α-alumina contains α-alumina with solid-solved Fe and α-alumina with no solid-solved Fe; in the oxide film, the content of the first alumina is 30% by mass or more and 99.5% by mass or less, the content of the Fe oxide is 0.5% by mass or more and 40% by mass or less, and the content of Fe is more than 7% by mass and 35% by mass or less; and the predetermined range is at least 2 mm from the exposed end surface in a direction in which a gas flows.

(2) The metal substrate for catalytic converter according to (1) above in which the oxide film further contains at least one type of a second alumina and a Cr oxide, and the second alumina comprises at least one or more types of γ, θ, χ, δ, η, and κ aluminas.

(3) The metal substrate for catalytic converter according to (1) or (2) above, in which, when T (μm) represents a thickness of the oxide film and G (% by mass) represents the content of Fe in the oxide film, a product of T (μm) and G (% by mass) is more than 4.0 and 20.0 or less.

(4) The metal substrate for catalytic converter according to any one of (1) to (3) above, in which the corrugated foil has an offset part having mutually different phases between adjacent waves in the axial direction of the honeycomb core, and the oxide film in the predetermined range is formed in the offset part.

(5) The metal substrate for catalytic converter according to anyone of (1) to (4) above, in which the corrugated foil is a stainless foil and contains at least Fe, Cr, and Al; and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

(6) A catalyst carrier characterized by having the metal substrate for catalytic converter according to any one of (1) to (5) above and a catalyst carried on the flat foil and the corrugated foil.

(7) The catalyst carrier according to (6) above which is characterized by being used in a purification device for purifying a diesel exhaust gas.

(8) The catalyst carrier according to (6) above which is characterized by being used in a purification device for purifying an exhaust gas resulting from combustion of gasoline.

Advantageous Effects of Invention

According to the present invention, it is possible to protect a catalyst carrier from wind erosion by forming an oxide film in which 30% by mass or more of α-alumina is contained in a predetermined range including an exposed end surface exposed toward a gas inlet side of the catalyst carrier and the Fe concentration is increased to exceed 7% by mass. It is also possible to prevent the purification performance from readily deteriorating due to an increase in Fe concentration by containing a Fe oxide in the oxide film in conjunction with α-alumina.

DESCRIPTION OF EMBODIMENTS

Figure 1:
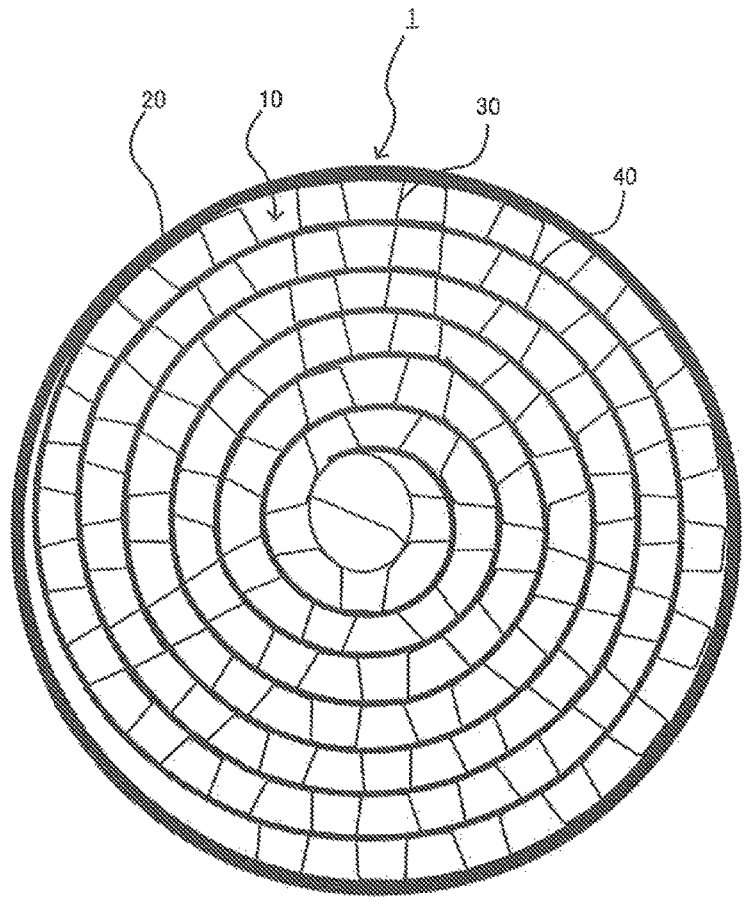
FIG. 1 is a schematic view illustrating a catalyst carrier.
Figure 2:
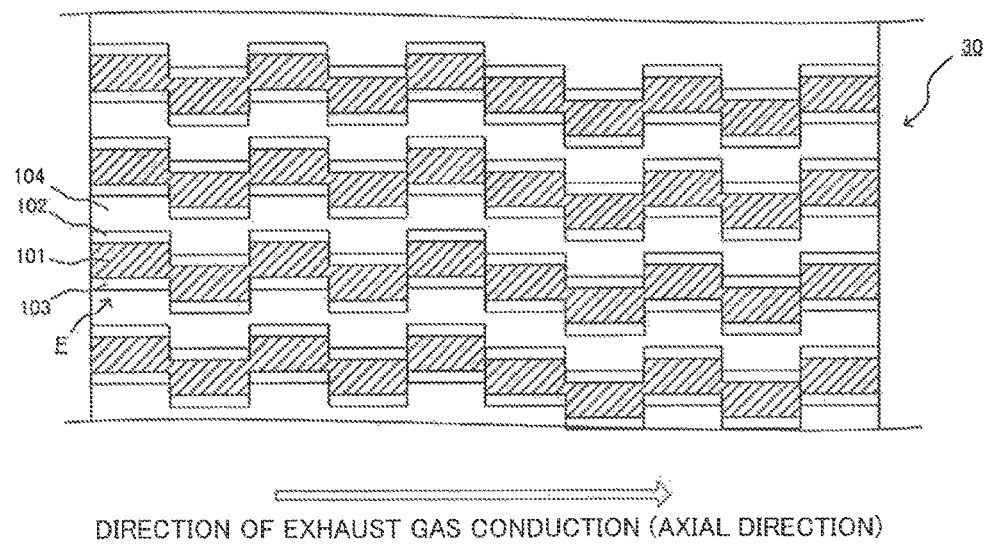
FIG. 2 is a developed view illustrating part of a corrugated foil (with offset).
Figure 3:
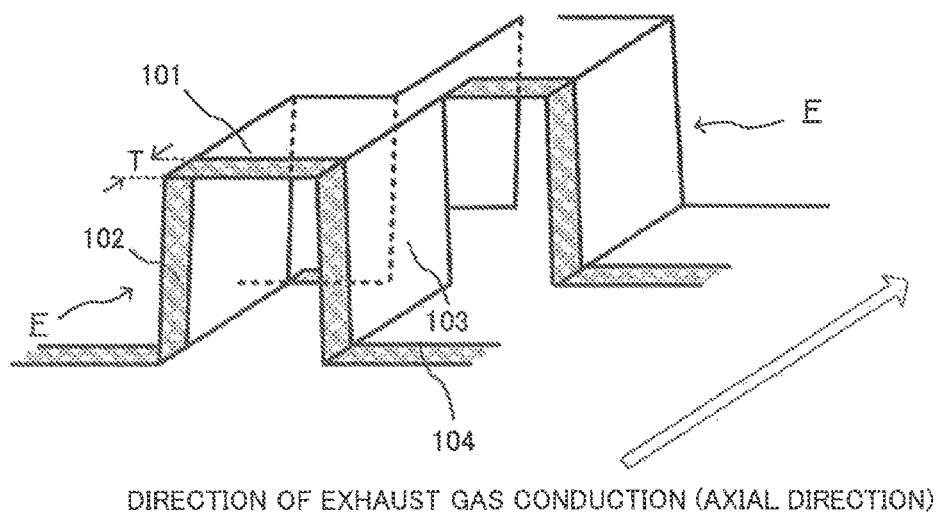
FIG. 3 is a perspective view illustrating adjacent fins in an axial direction.

With reference to the drawings, a description will be given of an embodiment. FIG. 1 is a schematic view illustrating a catalyst carrier when viewed in an axial direction. The direction normal to the page surface corresponds to the axial direction, and the direction along the page surface corresponds to the radial direction. FIG. 2 is a developed view illustrating part of the corrugated foil. The hollow arrow corresponds to the direction in which an exhaust gas flows (equivalent to the axial direction mentioned above), and the portion shown by hatching is equivalent to the top surface of a fin F. FIG. 3 is a perspective view illustrating adjacent fins in the axial direction.

A catalyst carrier 1 is constituted by a honeycomb core 10 and an outer jacket 20 and is used as a catalytic converter for purifying exhaust gases. The catalyst carrier 1 can be used in a purification device for converting NOx contained in a diesel exhaust gas into harmless substances. More specifically, it is possible to employ the catalyst carrier 1 as the DOC and the SCR that are provided in a diesel exhaust gas processing facility. Unburned gases contained in an exhaust gas contain hydrocarbon, carbon monoxide, and nitric oxide. The catalyst carrier 1 serving as the DOC oxidizes hydrocarbon into water and carbon dioxide, oxidizes carbon monoxide into carbon dioxide, and oxidizes nitric oxide into nitrogen dioxide. Note that since nitrogen dioxide is a gas having a very strong oxidizing power, nitrogen dioxide is brought into contact with the PM deposited in the DPF that is disposed downstream of the DOC and burns the PM.

The catalyst carrier 1 serving as the SCR accelerates the chemical reaction between nitrogen oxide contained in an exhaust gas discharged from the DPF and ammonia so as to be reduced to nitrogen and water. Ammonia is produced by blowing a urea solution from a urea solution tank to upstream of the SCR through an injector so as to undergo hydrolysis with the heat of an exhaust gas.

The honeycomb core 10 is configured by superimposing and then winding a corrugated foil 30 and a flat foil 40 around an axis. The honeycomb core 10 is circular in cross section in the radial direction. The corrugated foil 30 and the flat foil 40 may be formed of a stainless foil for carrying a catalyst. The component system of the stainless foil will be discussed later.

With reference to the developed view of FIG. 2, the corrugated foil 30 is formed in an offset structure. Here, the offset structure refers to a structure in which adjacent fins F have mutually different phases in the axial direction. In this embodiment, the fins F arranged in the axial direction are disposed in a staggered arrangement. However, the offset structure is not limited to the staggered arrangement but may also be arranged in other structures. The other structures will be discussed later. Furthermore, the offset structure may be formed for the entirety of the corrugated foil 30 or part of the corrugated foil 30. As described above, the corrugated foil 30 is formed in an offset structure, thereby increasing the exhaust gas to be brought into contact with the corrugated foil 30 and enhancing the purification performance of the catalyst carrier 1.

The individual fin F is provided with a top surface 101, a left diagonal side 102 and a right diagonal side 103. A left diagonal side 102 extends from one end of the the top surface 101, and a right diagonal side 103 extends from the other end of the top surface 101. The left diagonal side 102 and the right diagonal side 103 are tilted so as to be spaced apart from each other with increasing distance from the top surface 101. That is, the fin F is formed in a trapezoidal shape when viewed in the axial direction.

The top surfaces 101 of axially adjacent fins F are partially connected to each other. The fins F adjacent in the circumferential direction of the honeycomb core 10 are connected to each other via a connecting part 104. More specifically, the lower ends of the right diagonal side 103 of one fin F and the left diagonal side 102 of the other fin F, which are adjacent to each other, are connected together, thereby enabling the fins F adjacent in the circumferential direction to be connected to each other.

This makes it possible to enhance rigidity because the corrugated foil 30 including the fins F disposed in a staggered arrangement is formed of one plate-shaped material.

Here, a problem of wind erosion that may occur when the catalyst carrier 1 is applied, for example, to the DOC or the SCR that is provided in a diesel exhaust gas processing facility is avoided in this embodiment. To this end, there is formed an oxide film having a thickness of 0.1 [μm] or more and 10 [μm] or less in a predetermined range T which includes the end surface on the gas inlet side of each fin F, that is, an exposed end surface that is exposed toward the gas inlet side of each fin F. The predetermined range T is at least 2 mm from the exposed end surface. A region less than 2 mm in which the oxide film is formed causes wind erosion to readily occur. The partial perspective view of FIG. 3 illustrates, by hatching, the region in which the oxide film is formed. Note that the predetermined range T may exceed 2 mm because at least 2 mm is required. Furthermore, the oxide film is also formed in the predetermined range T which includes the exposed end surface that is exposed toward the gas inlet side of the flat foil 40. The predetermined range T is not to be repeatedly explained.

The oxide film contains α-alumina (equivalent to the first alumina) that is 30% by mass or more and 99.5% by mass or less, and a Fe oxide. Furthermore, the oxide film may further contain at least one type of a second alumina and a Cr oxide. The second alumina comprises at least one type of γ, θ, χ, δ, η, and κ aluminas. The oxide film of this embodiment is formed by applying a special heat treatment to the stainless foil for carrying a catalyst (hereafter, referred to as the special heat treatment).

Furthermore, the oxide film formed by the special heat treatment contains more than 7% by mass and 35% by mass or less of Fe. Fe contained in the oxide film is partially solid-solved in α-alumina. That is, the α-alumina contained in the oxide film contains α-alumina in which Fe is solid-solved and α-alumina in which no Fe is solid-solved. On the other hand, when at least one type of the second alumina and Cr oxide is contained in the oxide film, Fe may be solid-solved in them. The stainless foil of the honeycomb core according to the present invention contains at least Fe, Cr, and Al. The Al contained is used to form, for example, α-alumina on the surface of the stainless foil.

The desirable range of the total amount of Al that is contained in the stainless foil and the oxide film as α-alumina or the like is 1.5% by mass or more and 13% by mass or less. When the total amount of Al is less than 1.5%, Al contained in the stainless foil is consumed for generating α-alumina, so that Al in the stainless foil may be exhausted. In this case, the stainless foil is frayed due to abnormal oxidation. Thus, the total amount of Al is desirably 1.5% or more. When the total amount of Al exceeds 13%, the toughness of the stainless foil would be considerably degraded to cause the foil to be chipped or cracked due to the pressure or vibration of an exhaust gas, impairing structural reliability. Thus, the maximum total concentration of Al contained in the oxide film and the stainless foil is preferably 13% or less.

The desirable range of the amount of all Fe contained in the stainless foil and the oxide film is 60% by mass or more and 85% by mass or less. When the amount of all Fe is less than 60%, the concentration of Fe contained in the oxide film is hard to be controlled to fall within the scope of the present invention, thus causing wind erosion to readily occur. When the amount of all Fe exceeds 85%, the content of α-alumina contained in the oxide film is hard to be controlled to fall within the scope of the present invention, thus causing wind erosion to readily occur. Thus, the total amount of Fe contained in the oxide film and the stainless foil is desirably 60% or more and 85% or less.

In the present invention, Cr stabilizes α-alumina and improves oxidation resistance. The desirable range of the total amount of Cr contained in the stainless foil and the oxide film is 9% by mass or more and 30% by mass or less. When the total amount of Cr is less than 9%, only insufficient effects are provided. When the total amount of Cr exceeds 30%, the steel becomes brittle and may not endure cold rolling or processing, so that the range is preferably 9% or more and 30% or less. Some of Cr is found in the oxide film in the state of Cr oxide, and the remainder of Cr is found in the stainless foil without being changed. However, the Cr oxide is not indispensable, but all the Cr may remain in the stainless foil without being changed.

The stainless foil may further contain at least one type of Ti, Zr, Nb, Hf, Mg, Ca, Ba, Y, and a rare-earth element.

Ti, Zr, Nb, and Hf have the effects of degrading the oxygen permeability of another oxide film that is formed as an underlayer between the oxide film including the aforementioned α-alumina and the stainless foil and considerably reducing oxidation speeds. However, when the total of these elements exceeds 2.0%, an intermetallic compound is increasingly precipitated in the foil to make the foil brittle. Thus, the total thereof is preferably 2.0% or less.

Mg, Ca, and Ba are also solid-solved in alumina and may improve the high-temperature oxidation resistance of the stainless foil. When the total of these elements exceeds 0.01%, the toughness of the foil is degraded. Thus, it is preferable that the total be 0.01% or less.

Y and the rare-earth element can be doped as an element for ensuring the adhesive property of the oxide film. However, when the total of these elements exceeds 0.5%, an intermetallic compound is increasingly precipitated in the foil to make the toughness degraded. Thus, the total thereof is preferably 0.5% or less.

The stainless foil further contains C, Si, and Mn as an unavoidable impurity.

Since C has an adverse effect on the toughness, ductility, and oxidation resistance of the stainless foil, the lower, the more desirable. In the present invention, since 0.1% or less of C would result in an allowable practical damage, it is desirable for the upper limit thereof to be 0.1%.

Si degrades the toughness and ductility of the stainless foil, and in general, improves the oxidation resistance; however, when the amount of Si exceeds 2%, not only the effects are decreased but also the toughness is degraded. Thus, the amount of Si is preferably 2% or less.

When Mn is contained in an amount exceeding 2%, the oxidation resistance of the stainless foil is deteriorated. Thus, the upper limit thereof is preferably 2%.

A description will next be given of the reason why the component of the oxide film is restricted. The α-alumina is expressed by a molecular formula of $Al_2O_3$ in a typical corundum crystalline structure (hexagonal) and has an outstanding wind erosion resistance to particles contained in an exhaust gas. Thus, the lower limit value of the α-alumina contained in the oxide film was set to 30% by mass. On the other hand, the special heat treatment performed on the stainless foil would inevitably cause Fe oxide to be formed and depending on the heating condition, cause at least one or more types of γ, θ, χ, δ, η, and κ aluminas and/or Cr oxide to be formed. In other words, the oxide film also contains the oxide except for the α-alumina. Thus, the upper limit of α-alumina contained in the oxide film was set to 99.5% by mass. Furthermore, when the content of the α-alumina is 50% or more, the hardness of the oxide film is increased, providing further improved wind erosion resistance. Thus, a more preferable lower limit is 50%. Furthermore, when the upper limit value is 99% or less, the toughness of the oxide film is improved to prevent occurrence of cracks or stripping. Thus, a more preferable upper limit was set to 99%.

The content of Fe oxide relative to the oxide film is 0.5% by mass or more and 40% by mass or less. When the content of Fe oxide is less than 0.5% by mass, Fe is eluted into the catalyst with ease and the purification performance is prone to deteriorate. Thus, the content thereof was set to 0.5% by mass or more. When the content of Fe oxide exceeds 40% by mass, α-alumina is formed with difficulty and wind erosion resistance is degraded. Thus, the content thereof was set to 40% by mass or less. The inventors found in a separate study that the Fe oxide comprises at least one type of wustite (FeO), magnetite ($Fe_3O_4$), and hematite ($Fe_2O_3$).

As described above, the content of Fe relative to the oxide film is more than 7% by mass and 35% by mass or less. When the content of Fe is 7% by mass or less, the toughness of the oxide film is degraded to cause cracks or stripping to occur with ease. Thus, the content of Fe was set to more than 7% by mass. In other words, increasing the content of Fe to more than 7% by mass causes the outstanding wind erosion resistance to particles contained in the exhaust gas to be exhibited. When the content of Fe exceeds 35% by mass, Fe may be eluted into the catalyst layer to considerably degrade the purification performance. Thus, the content thereof was set to 35% by mass or less. The content of Fe contained in the oxide film can be determined by using a quantitative GDS (Glow Discharge Spectrometer) to measure the distribution of component elements such as Fe, Cr, Al, or O while sputtering is being conducted in the thickness direction of the oxide film, and then by computing the average value of Fe content relative to the oxide film on the basis of the measurement results.

Here, in Patent Literature 3, it is concerned that, when Fe contained in the oxide film exceeds 7% by mass, the Fe is abruptly eluted into the catalyst layer. In contrast to this, in this embodiment, since Fe is prevented from moving to the catalyst layer by forming the oxide film containing Fe oxide, the purification performance would never be significantly degraded even with the Fe concentration increased to exceed 7% by mass.

The content of Cr contained in the oxide film is preferably 0.01% by mass or more and 4% by mass or less. When the content of Cr is less than 0.01%, the toughness of the oxide film is degraded to cause cracks or stripping to occur with ease. Thus, the content of Cr was set to 0.01% or more. When the content of Cr exceeds 4%, Cr may be eluted into the catalyst layer to considerably degrade the purification performance. Thus, the content thereof was set to 4% or less.

Here, when T [μm] represents the thickness of the oxide film and G [% by mass] represents the content of Fe contained in the oxide film, the product of T [μm] and G [% by mass] is preferably more than 4.0 and 20.0 or less. When the product of T [μm] and G [% by mass] is 4.0 or less, the toughness and strength of the oxide film is degraded to cause stripping to occur with ease. Thus, the product was set to more than 4.0. When the product of T [μm] and G [% by mass] exceeds 20.0, cracks occur in the oxide film with ease to degrade the durability. Thus, the product was set to 20.0 or less. Note that the thickness of the oxide film can be measured by directly observing the oxide film under the electron microscope such as a TEM (Transmission Electron Microscope) or SEM (Scanning Electron Microscope). Furthermore, the type and content of each oxide contained in the oxide film can be identified by performing the phase identification and the quantitative measurement by the X-ray diffraction. In the quantitative measurement, the content can be measured by preparing a calibration curve with a standard sample and comparing intense of diffraction lines. This will be described in more detail, for example, in Kunio Kataoka and Sadafumi Isshiki; Production Studies Vol. 12, No. 8.

Figure 4:
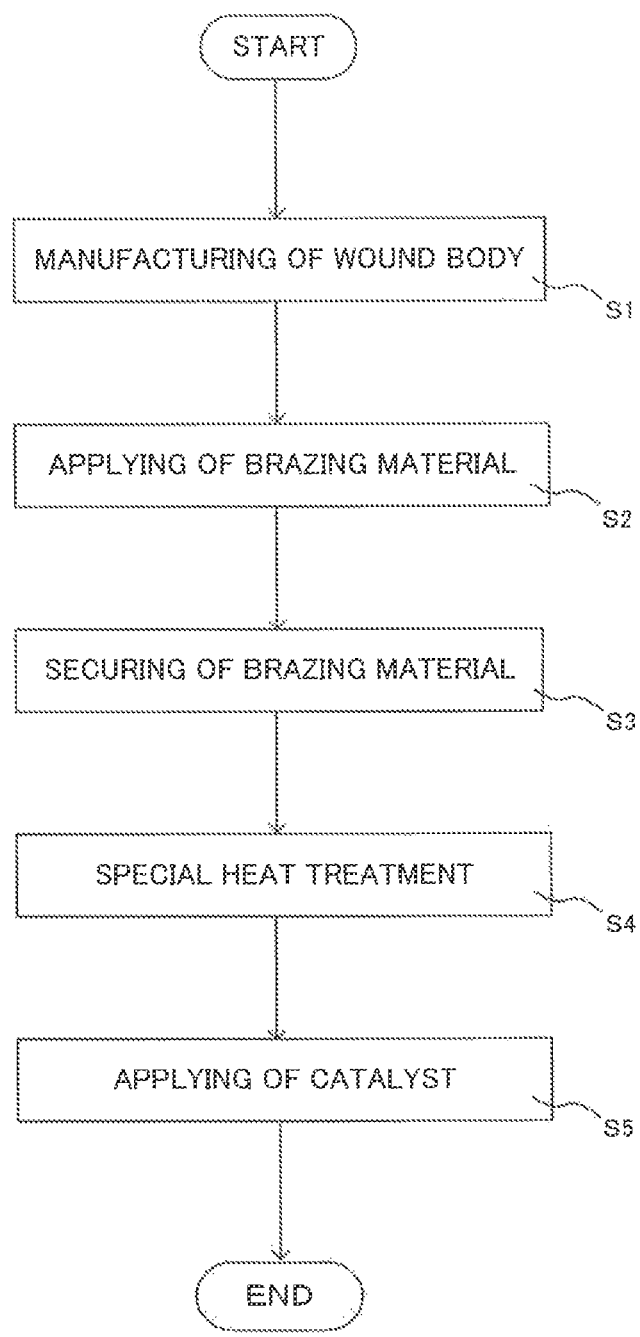
FIG. 4 is an explanatory process diagram showing a method of manufacturing a catalyst carrier.

With reference to the process diagram of FIG. 4, a description will next be given of a method for manufacturing a catalyst carrier of this embodiment including the special heat treatment. In step S1, a stainless foil extending in the shape of a strip is pressed to form asperities, and wound around a predetermined axis, while being superimposed on the flat foil, thereby manufacturing the honeycomb core 10.

In step S2, the honeycomb core 10 is inserted into the tubular outer jacket 20 formed of stainless, and then a brazing material is applied to the portions of the honeycomb core 10 and the outer jacket 20 which are to adhere to each other. In step S3, the honeycomb core 10 and the outer jacket 20 to which the brazing material has been applied are subjected to a heat treatment in a vacuum atmosphere to harden the brazing material.

In step S4, the special heat treatment is performed. The special heat treatment is performed by flowing a gas from the end portion on the inlet side of the honeycomb core 10 to the end portion on the outlet side under the conditions of a particular atmosphere and temperature in the honeycomb core 10 inserted in the outer jacket 20. The particular atmosphere has an oxygen partial pressure from 10 Pa to about an atmospheric pressure and is an oxidizing atmosphere with the water vapor dew point controlled to 30° C. or higher and 60° C. or lower. The temperature of the particular atmosphere is controlled in a range from 800° C. to 1300° C. In particular, the water vapor dew point exerts crucial influences on controlling the amount of Fe contained in the oxide film within the scope of the present invention and on forming Fe oxide in the oxide film. At less than 30° C., the formation of Fe oxide would be suppressed, and the effects of the present invention could be unavailable. At over 60° C., the oxide film could not sufficiently contain Fe oxide. Thus, the desirable water vapor dew point of the special heat treatment was set to 30° C. or higher and 60° C. or lower.

For the gas, a gas in the particular atmosphere can be employed with no change made thereto. The flow rate of the gas is desirably 0.1 (1/h) to 12 (1/h) as the SV (Space Velocity) value per a honeycomb core. When the SV value is less than 0.1 (1/h), the content of α-alumina contained in the oxide film formed on the end surface on the inlet side of each fin F may possibly be degraded to 30% by mass or less or no Fe oxide may possibly be contained in the oxide film. On the other hand, when the SV value exceeds 12 (1/h), the effects of generating Fe oxide in the oxide film may be saturated. Furthermore, the duration of the special heat treatment may preferably be 1 (h) to 4 (h).

The gas having flown into each flow path of the honeycomb core 10 moves toward the end surface on the outlet side of the honeycomb core 10 while colliding with the end surface on the inlet side of each fin F. At this time, all the wall surfaces of each fin F with which the gas was brought into contact are oxidized. However, since the gas directly collides with the predetermined range including the end surface on the inlet side of each fin F, an oxide film having a component different from that of the other wall surfaces, that is, an oxide film containing at least 30% by mass or more of α-alumina and Fe oxide is formed. On the other hand, the oxide film to be formed on the end surface on the gas outlet side may not necessarily be the oxide film of the present invention; for example, the content percentage of α-alumina can be 10% by mass or more and less than 30% by mass with no problem.

Here, the thickness of the oxide film can be varied by adjusting the time during which the aforementioned gas is flown. The thickness of the oxide film to be formed in the predetermined range T including the exposed end surface is 0.1 μm or more and 10 μm or less as described above.

As described above, in this embodiment, the honeycomb core 10 is exposed to a heating atmosphere, and a gas in this atmosphere is blown in through the end surface on the inlet side of the honeycomb core 10 to perform oxidation processing. It is thus possible to form, on the end surface on the inlet side of each fin F, an oxide film having an outstanding wind erosion resistance and containing 30% by mass or more of α-alumina. Note that the honeycomb core 10 and the outer jacket 20 manufactured by following step S1 to step S4 are equivalent to the metal substrate for catalytic converter according to the claims.

In step 5, the honeycomb core 10 and the outer jacket 20 with the oxide film formed on the exposed end surface of each fin F are immersed in a catalyst bath to manufacture the catalyst carrier 1.

Figure 7:
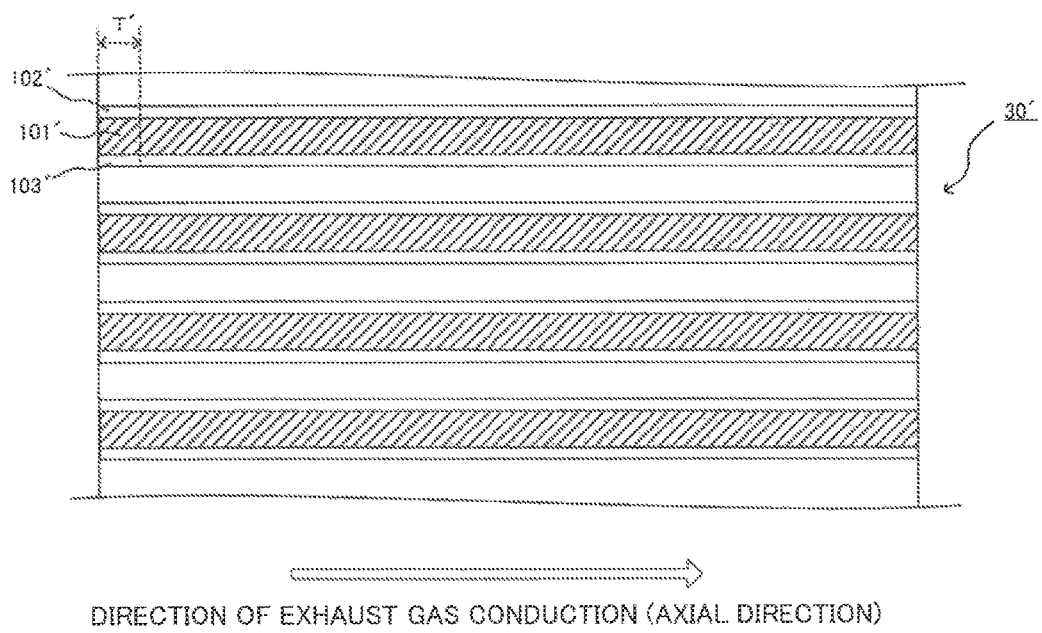
FIG. 7 is a developed view illustrating part of the corrugated foil (without offset).

In the aforementioned embodiment, the corrugated foil 30 provided with the offset structure was described; however, the present invention can also be applied to a corrugated foil having no offset structure. FIG. 7 is a developed view illustrating a corrugated foil 30' with no offset structure. As illustrated in the same figure, a top surface 101', a left diagonal side 102', and a right diagonal side 103' each extend without any phase shift in the direction of exhaust gas conduction. The oxide film of the present invention can be formed in a predetermined range T' that includes the end surface on the inlet side of the corrugated foil 30' (the left end portion in FIG. 7). The predetermined range T' is the same as the predetermined range T and will not be repeatedly described.

The present invention will be described in more detail byway of examples.

EXAMPLE 1

The content of α-alumina contained in the oxide film was adjusted to evaluate the wind erosion resistance of each catalyst carrier. Each type of catalyst carriers was applied to the DOC provided in a diesel exhaust gas processing facility to perform a traveling test corresponding to 200,000 (km), and thereafter, the wind erosion property and the purification performance of the catalyst carrier were evaluated. As for the wind erosion property, the weights of the catalyst carrier before and after the test were compared, so that the wind erosion property was determined to be good and evaluated as "good" when the decrease in the weight was 1% by mass or less, whereas the wind erosion property was determined to be bad and evaluated as "poor" when the decrease in the weight exceeded 1% by mass. The purification performance was evaluated as the deterioration rate of the final performance to the initial performance, so that the deterioration of the purification performance was determined to be at a low level and evaluated as "good" when the deterioration rate was 30% or less, whereas the deterioration of the purification performance was determined to be at a high level and evaluated as "poor" when the deterioration rate was more than 30%. The initial performance was defined as the purification performance that was measured when the cumulative time during which the catalyst temperature was 900° C. reached one hour. The purification rate of CO, HC, and NOx was measured as the purification performance. The final performance was defined as the purification performance that was measured when the cumulative time during which the catalyst temperature was 900° C. reached 500 hours. Table 1 summarizes these test results, and "REM" shown in the column of the doped element is the abbreviation for misch metal. Furthermore, "THICKNESS" in Table 2 and 4 is equivalent to the thickness of the oxide film.

TABLE 1

| | | FOIL COMPONENT (INCLUDING OXIDE) | | | | | |
| --- | --- | --- | --- | --- | --- | --- | --- |
| No. | FOIL THICK-NESS μm | Cr % by mass | Al % by mass | Fe % by mass | DOPED ELEMENT % by mass | UNAVOID-ABLE IMPURITY % by mass | REMARKS |
| 1 | 30 | 20.1 | 5.2 | 73.2 | 0.08% Ti, 0.09% REM | C, Si, Mn | COMPARATIVE EXAMPLE 1 |
| 2 | 30 | 20.1 | 5.2 | 73.2 | 0.08% Ti, 0.09% REM | C, Si, Mn | COMPARATIVE EXAMPLE 2 |
| 3 | 30 | 20.1 | 5.2 | 73.2 | 0.08% Ti, 0.09% REM | C, Si, Mn | COMPARATIVE EXAMPLE 3 |
| 4 | 30 | 20.1 | 5.2 | 73.2 | 0.08% Ti, 0.09% REM | C, Si, Mn | COMPARATIVE EXAMPLE 4 |
| 5 | 30 | 20.1 | 5.2 | 73.2 | 0.08% Ti, 0.09% REM | C, Si, Mn | COMPARATIVE EXAMPLE 5 |
| 6 | 30 | 20.1 | 5.2 | 73.2 | 0.08% Ti, 0.09% REM | C, Si, Mn | COMPARATIVE EXAMPLE 6 |
| 7 | 30 | 20.1 | 5.2 | 73.2 | 0.08% Ti, 0.09% REM | C, Si, Mn | INVENTIVE EXAMPLE 1 |
| 8 | 30 | 20.1 | 5.2 | 73.2 | 0.08% Ti, 0.09% REM | C, Si, Mn | INVENTIVE EXAMPLE 2 |
| 9 | 30 | 20.1 | 5.2 | 73.2 | 0.08% Ti, 0.09% REM | C, Si, Mn | INVENTIVE EXAMPLE 3 |
| 10 | 30 | 20.1 | 5.2 | 73.2 | 0.08% Ti, 0.09% REM | C, Si, Mn | INVENTIVE EXAMPLE 4 |
| 11 | 30 | 20.1 | 5.2 | 73.2 | 0.08% Ti, 0.09% REM | C, Si, Mn | COMPARATIVE EXAMPLE 7 |
| 12 | 30 | 20.1 | 5.2 | 73.2 | 0.08% Ti, 0.09% REM | C, Si, Mn | INVENTIVE EXAMPLE 5 |
| 13 | 30 | 20.1 | 5.2 | 73.2 | 0.08% Ti, 0.09% REM | C, Si, Mn | INVENTIVE EXAMPLE 6 |
| 14 | 30 | 20.1 | 5.2 | 73.2 | 0.08% Ti, 0.09% REM | C, Si, Mn | INVENTIVE EXAMPLE 7 |
| 15 | 30 | 20.1 | 5.2 | 73.2 | 0.08% Ti, 0.09% REM | C, Si, Mn | INVENTIVE EXAMPLE 8 |
| 16 | 30 | 20.1 | 5.2 | 73.2 | 0.08% Ti, 0.09% REM | C, Si, Mn | COMPARATIVE EXAMPLE 8 |
| 17 | 30 | 20.1 | 5.2 | 73.2 | 0.08% Ti, 0.09% REM | C, Si, Mn | INVENTIVE EXAMPLE 9 |
| 18 | 30 | 20.1 | 5.2 | 73.2 | 0.08% Ti, 0.09% REM | C, Si, Mn | INVENTIVE EXAMPLE 10 |
| 19 | 30 | 20.1 | 5.2 | 73.2 | 0.08% Ti, 0.09% REM | C, Si, Mn | INVENTIVE EXAMPLE 11 |
| 20 | 30 | 20.1 | 5.2 | 73.2 | 0.08% Ti, 0.09% REM | C, Si, Mn | INVENTIVE EXAMPLE 12 |
| 21 | 20 | 19.8 | 7.5 | 71.5 | 0.10% Zr 0.11% La | C, Si, Mn | COMPARATIVE EXAMPLE 9 |
| 22 | 20 | 19.8 | 7.5 | 71.5 | 0.10% Zr 0.11% La | C, Si, Mn | COMPARATIVE EXAMPLE 10 |
| 23 | 20 | 19.8 | 7.5 | 71.5 | 0.10% Zr 0.11% La | C, Si, Mn | COMPARATIVE EXAMPLE 11 |
| 24 | 20 | 19.8 | 7.5 | 71.5 | 0.10% Zr 0.11% La | C, Si, Mn | COMPARATIVE EXAMPLE 12 |
| 25 | 20 | 19.8 | 7.5 | 71.5 | 0.10% Zr 0.11% La | C, Si, Mn | COMPARATIVE EXAMPLE 13 |
| 26 | 20 | 19.8 | 7.5 | 71.5 | 0.10% Zr 0.11% La | C, Si, Mn | COMPARATIVE EXAMPLE 14 |
| 27 | 20 | 19.8 | 7.5 | 71.5 | 0.10% Zr 0.11% La | C, Si, Mn | INVENTIVE EXAMPLE 13 |
| 28 | 20 | 19.8 | 7.5 | 71.5 | 0.10% Zr 0.11% La | C, Si, Mn | INVENTIVE EXAMPLE 14 |
| 29 | 20 | 19.8 | 7.5 | 71.5 | 0.10% Zr 0.11% La | C, Si, Mn | INVENTIVE EXAMPLE 15 |
| 30 | 20 | 19.8 | 7.5 | 71.5 | 0.10% Zr 0.11% La | C, Si, Mn | INVENTIVE EXAMPLE 16 |
| 31 | 20 | 19.8 | 7.5 | 71.5 | 0.10% Zr 0.11% La | C, Si, Mn | COMPARATIVE EXAMPLE 15 |
| 32 | 20 | 19.8 | 7.5 | 71.5 | 0.10% Zr 0.11% La | C, Si, Mn | INVENTIVE EXAMPLE 17 |
| 33 | 20 | 19.8 | 7.5 | 71.5 | 0.10% Zr 0.11% La | C, Si, Mn | INVENTIVE EXAMPLE 18 |
| 34 | 20 | 19.8 | 7.5 | 71.5 | 0.10% Zr 0.11% La | C, Si, Mn | INVENTIVE EXAMPLE 19 |
| 35 | 20 | 19.8 | 7.5 | 71.5 | 0.10% Zr 0.11% La | C, Si, Mn | INVENTIVE EXAMPLE 20 |
| 36 | 20 | 19.8 | 7.5 | 71.5 | 0.10% Zr 0.11% La | C, Si, Mn | COMPARATIVE EXAMPLE 16 |

TABLE 1-continued

| | | FOIL COMPONENT (INCLUDING OXIDE) | | | | | |
|---|---|---|---|---|---|---|---|
| No. | FOIL THICK-NESS μm | Cr % by mass | Al % by mass | Fe % by mass | DOPED ELEMENT % by mass | UNAVOID-ABLE IMPURITY % by mass | REMARKS |
| 37 | 20 | 19.8 | 7.5 | 71.5 | 0.10% Zr 0.11% La | C, Si, Mn | INVENTIVE EXAMPLE 21 |
| 38 | 20 | 19.8 | 7.5 | 71.5 | 0.10% Zr 0.11% La | C, Si, Mn | INVENTIVE EXAMPLE 22 |
| 39 | 20 | 19.8 | 7.5 | 71.5 | 0.10% Zr 0.11% La | C, Si, Mn | INVENTIVE EXAMPLE 23 |
| 40 | 20 | 19.8 | 7.5 | 71.5 | 0.10% Zr 0.11% La | C, Si, Mn | INVENTIVE EXAMPLE 24 |
| 41 | 50 | 18.1 | 3.5 | 77.9 | 0.1% Nb, 0.09% Hf | C, Si, Mn | COMPARATIVE EXAMPLE 17 |
| 42 | 50 | 18.1 | 3.5 | 77.9 | 0.1% Nb, 0.09% Hf | C, Si, Mn | COMPARATIVE EXAMPLE 18 |
| 43 | 50 | 18.1 | 3.5 | 77.9 | 0.1% Nb, 0.09% Hf | C, Si, Mn | COMPARATIVE EXAMPLE 19 |
| 44 | 50 | 18.1 | 3.5 | 77.9 | 0.1% Nb, 0.09% Hf | C, Si, Mn | COMPARATIVE EXAMPLE 20 |
| 45 | 50 | 18.1 | 3.5 | 77.9 | 0.1% Nb, 0.09% Hf | C, Si, Mn | COMPARATIVE EXAMPLE 21 |
| 46 | 50 | 18.1 | 3.5 | 77.9 | 0.1% Nb, 0.09% Hf | C, Si, Mn | COMPARATIVE EXAMPLE 22 |
| 47 | 50 | 18.1 | 3.5 | 77.9 | 0.1% Nb, 0.09% Hf | C, Si, Mn | INVENTIVE EXAMPLE 25 |
| 48 | 50 | 18.1 | 3.5 | 77.9 | 0.1% Nb, 0.09% Hf | C, Si, Mn | INVENTIVE EXAMPLE 26 |
| 49 | 50 | 18.1 | 3.5 | 77.9 | 0.1% Nb, 0.09% Hf | C, Si, Mn | INVENTIVE EXAMPLE 27 |
| 50 | 50 | 18.1 | 3.5 | 77.9 | 0.1% Nb, 0.09% Hf | C, Si, Mn | INVENTIVE EXAMPLE 28 |
| 51 | 50 | 18.1 | 3.5 | 77.9 | 0.1% Nb, 0.09% Hf | C, Si, Mn | COMPARATIVE EXAMPLE 23 |
| 52 | 50 | 18.1 | 3.5 | 77.9 | 0.1% Nb, 0.09% Hf | C, Si, Mn | INVENTIVE EXAMPLE 29 |
| 53 | 50 | 18.1 | 3.5 | 77.9 | 0.1% Nb, 0.09% Hf | C, Si, Mn | INVENTIVE EXAMPLE 30 |
| 54 | 50 | 18.1 | 3.5 | 77.9 | 0.1% Nb, 0.09% Hf | C, Si, Mn | INVENTIVE EXAMPLE 31 |
| 55 | 50 | 18.1 | 3.5 | 77.9 | 0.1% Nb, 0.09% Hf | C, Si, Mn | INVENTIVE EXAMPLE 32 |
| 56 | 50 | 18.1 | 3.5 | 77.9 | 0.1% Nb, 0.09% Hf | C, Si, Mn | COMPARATIVE EXAMPLE 24 |
| 57 | 50 | 18.1 | 3.5 | 77.9 | 0.1% Nb, 0.09% Hf | C, Si, Mn | INVENTIVE EXAMPLE 33 |
| 58 | 50 | 18.1 | 3.5 | 77.9 | 0.1% Nb, 0.09% Hf | C, Si, Mn | INVENTIVE EXAMPLE 34 |
| 59 | 50 | 18.1 | 3.5 | 77.9 | 0.1% Nb, 0.09% Hf | C, Si, Mn | INVENTIVE EXAMPLE 35 |
| 60 | 50 | 18.1 | 3.5 | 77.9 | 0.1% Nb, 0.09% Hf | C, Si, Mn | INVENTIVE EXAMPLE 36 |

TABLE 2

| | HEAT TREATMENT | | | | | | END SURFACE ON INLET SIDE TO 2 mm REGION | |
|---|---|---|---|---|---|---|---|---|
| NO. | TEMPER-ATURE °C. | TIME h | ENVIRONMENT | SV VALUE h$^{-1}$ | WATER VAPOR DEW POINT °C. | OFFSET | THICKNESS μm | α-ALUMINA % by mass |
| 1 | | | UNAVAILABLE | | — | UNAVAILABLE | UNAVAIL-ABLE | 0 |
| 2 | 800 | 1 | ATMOSPHERE | 0 | 20 | UNAVAILABLE | 0.1 | 26 |
| 3 | 900 | 1 | ATMOSPHERE | 0 | 20 | UNAVAILABLE | 0.31 | 58 |
| 4 | 1000 | 1 | ATMOSPHERE | 0 | 20 | UNAVAILABLE | 0.61 | 82 |
| 5 | 1100 | 1 | ATMOSPHERE | 0 | 20 | UNAVAILABLE | 1.29 | 99.8 |
| 6 | 700 | 1 | ATMOSPHERE | 0.1 | 30 | UNAVAILABLE | 0.04 | 18 |
| 7 | 800 | 1 | ATMOSPHERE | 0.1 | 30 | UNAVAILABLE | 0.12 | 31 |
| 8 | 900 | 1 | ATMOSPHERE | 0.1 | 30 | UNAVAILABLE | 0.3 | 64 |
| 9 | 1000 | 1 | ATMOSPHERE | 0.1 | 30 | UNAVAILABLE | 0.6 | 85 |

TABLE 2-continued

| | | | | | | | | |
|---|---|---|---|---|---|---|---|---|
| 10 | 1100 | 1 | ATMOSPHERE | 0.1 | 30 | UNAVAILABLE | 1.3 | 99.4 |
| 11 | 700 | 1 | ATMOSPHERE | 1 | 30 | UNAVAILABLE | 0.05 | 23 |
| 12 | 800 | 1 | ATMOSPHERE | 1 | 30 | UNAVAILABLE | 0.13 | 32 |
| 13 | 900 | 1 | ATMOSPHERE | 1 | 30 | UNAVAILABLE | 0.3 | 64 |
| 14 | 1000 | 1 | ATMOSPHERE | 1 | 30 | UNAVAILABLE | 0.6 | 86 |
| 15 | 1100 | 1 | ATMOSPHERE | 1 | 30 | UNAVAILABLE | 1.3 | 98.6 |
| 16 | 700 | 1 | ATMOSPHERE | 10 | 30 | UNAVAILABLE | 0.05 | 21 |
| 17 | 800 | 1 | ATMOSPHERE | 10 | 30 | UNAVAILABLE | 0.12 | 31 |
| 18 | 900 | 1 | ATMOSPHERE | 10 | 30 | UNAVAILABLE | 0.3 | 62 |
| 19 | 1000 | 1 | ATMOSPHERE | 10 | 30 | UNAVAILABLE | 0.6 | 86 |
| 20 | 1100 | 1 | ATMOSPHERE | 10 | 30 | UNAVAILABLE | 1.3 | 97.2 |
| 21 | | | UNAVAILABLE | | — | UNAVAILABLE | UNAVAILABLE | 0 |
| 22 | 800 | 4 | ATMOSPHERE | 0 | 10 | UNAVAILABLE | 0.16 | 26 |
| 23 | 900 | 4 | ATMOSPHERE | 0 | 10 | UNAVAILABLE | 0.35 | 54 |
| 24 | 1000 | 4 | ATMOSPHERE | 0 | 10 | UNAVAILABLE | 0.68 | 81 |
| 25 | 1100 | 4 | ATMOSPHERE | 0 | 10 | UNAVAILABLE | 1.56 | 99.2 |
| 26 | 700 | 4 | ATMOSPHERE | 0.1 | 40 | UNAVAILABLE | 0.07 | 22 |
| 27 | 800 | 4 | ATMOSPHERE | 0.1 | 40 | UNAVAILABLE | 0.16 | 31 |
| 28 | 900 | 4 | ATMOSPHERE | 0.1 | 40 | UNAVAILABLE | 0.37 | 56 |
| 29 | 1000 | 4 | ATMOSPHERE | 0.1 | 40 | UNAVAILABLE | 0.71 | 87 |
| 30 | 1100 | 4 | ATMOSPHERE | 0.1 | 40 | UNAVAILABLE | 1.62 | 95.7 |
| 31 | 700 | 4 | ATMOSPHERE | 1 | 40 | UNAVAILABLE | 0.07 | 20 |
| 32 | 800 | 4 | ATMOSPHERE | 1 | 40 | UNAVAILABLE | 0.16 | 34 |
| 33 | 900 | 4 | ATMOSPHERE | 1 | 40 | UNAVAILABLE | 0.38 | 57 |
| 34 | 1000 | 4 | ATMOSPHERE | 1 | 40 | UNAVAILABLE | 0.72 | 85 |
| 35 | 1100 | 4 | ATMOSPHERE | 1 | 40 | UNAVAILABLE | 1.63 | 98.1 |
| 36 | 700 | 4 | ATMOSPHERE | 10 | 40 | UNAVAILABLE | 0.05 | 23 |
| 37 | 800 | 4 | ATMOSPHERE | 10 | 40 | UNAVAILABLE | 0.15 | 31 |
| 38 | 900 | 4 | ATMOSPHERE | 10 | 40 | UNAVAILABLE | 0.45 | 61 |
| 39 | 1000 | 4 | ATMOSPHERE | 10 | 40 | UNAVAILABLE | 0.75 | 84 |
| 40 | 1100 | 4 | ATMOSPHERE | 10 | 40 | UNAVAILABLE | 1.6 | 97.2 |
| 41 | | | UNAVAILABLE | | — | UNAVAILABLE | UNAVAILABLE | 0 |
| 42 | 800 | 0.5 | ATMOSPHERE | 0 | 5 | UNAVAILABLE | 0.1 | 25 |
| 43 | 900 | 0.5 | ATMOSPHERE | 0 | 5 | UNAVAILABLE | 0.24 | 53 |
| 44 | 1000 | 0.5 | ATMOSPHERE | 0 | 5 | UNAVAILABLE | 0.52 | 79 |
| 45 | 1100 | 0.5 | ATMOSPHERE | 0 | 5 | UNAVAILABLE | 1.12 | 93 |
| 46 | 700 | 0.5 | ATMOSPHERE | 0.1 | 55 | UNAVAILABLE | 0.05 | 19 |
| 47 | 800 | 0.5 | ATMOSPHERE | 0.1 | 55 | UNAVAILABLE | 0.12 | 32 |
| 48 | 900 | 0.5 | ATMOSPHERE | 0.1 | 55 | UNAVAILABLE | 0.24 | 57 |
| 49 | 1000 | 0.5 | ATMOSPHERE | 0.1 | 55 | UNAVAILABLE | 0.51 | 85 |
| 50 | 1100 | 0.5 | ATMOSPHERE | 0.1 | 55 | UNAVAILABLE | 1.12 | 94 |
| 51 | 700 | 0.5 | ATMOSPHERE | 1 | 55 | UNAVAILABLE | 0.05 | 22 |
| 52 | 800 | 0.5 | ATMOSPHERE | 1 | 55 | UNAVAILABLE | 0.12 | 34 |
| 53 | 900 | 0.5 | ATMOSPHERE | 1 | 55 | UNAVAILABLE | 0.26 | 61 |
| 54 | 1000 | 0.5 | ATMOSPHERE | 1 | 55 | UNAVAILABLE | 0.52 | 84 |
| 55 | 1100 | 0.5 | ATMOSPHERE | 1 | 55 | UNAVAILABLE | 1.13 | 95.1 |
| 56 | 700 | 0.5 | ATMOSPHERE | 10 | 55 | UNAVAILABLE | 0.05 | 20 |
| 57 | 800 | 0.5 | ATMOSPHERE | 10 | 55 | UNAVAILABLE | 0.13 | 31 |
| 58 | 900 | 0.5 | ATMOSPHERE | 10 | 55 | UNAVAILABLE | 0.27 | 60 |
| 59 | 1000 | 0.5 | ATMOSPHERE | 10 | 55 | UNAVAILABLE | 0.51 | 83 |
| 60 | 1100 | 0.5 | ATMOSPHERE | 10 | 55 | UNAVAILABLE | 1.15 | 96.3 |

| | END SURFACE ON INLET SIDE TO 2 mm REGION | | | EVALUATION | | | |
|---|---|---|---|---|---|---|---|
| NO. | REMAINDER TYPE | Fe CONTENT % by mass | THICKNESS × Fe CONTENT | Fe OXIDE % by mass | WIND EROSION | PURIFICATION PERFORMANCE | REMARKS |
| 1 | | | | | poor | poor | COMPARATIVE EXAMPLE 1 |
| 2 | SECOND ALUMINA | 15 | 1.5 | UNDETECTABLE | poor | poor | COMPARATIVE EXAMPLE 2 |
| 3 | SECOND ALUMINA | 6.4 | 2.0 | UNDETECTABLE | poor | good | COMPARATIVE EXAMPLE 3 |
| 4 | UNAVAILABLE | 1.3 | 0.8 | UNDETECTABLE | poor | good | COMPARATIVE EXAMPLE 4 |
| 5 | UNAVAILABLE | 0.3 | 0.4 | UNDETECTABLE | poor | good | COMPARATIVE EXAMPLE 5 |
| 6 | SECOND ALUMINA, Fe OXIDE | 53 | 2.1 | 65 | poor | poor | COMPARATIVE EXAMPLE 6 |
| 7 | SECOND ALUMINA, Fe OXIDE | 34 | 4.1 | 38 | good | good | INVENTIVE EXAMPLE 1 |
| 8 | SECOND ALUMINA, Fe OXIDE | 21 | 6.3 | 25 | good | good | INVENTIVE EXAMPLE 2 |

TABLE 2-continued

| | | | | | | | |
|---|---|---|---|---|---|---|---|
| 9 | Fe OXIDE | 12 | 7.2 | 17 | good | good | INVENTIVE EXAMPLE 3 |
| 10 | Fe OXIDE | 8.7 | 11.3 | 0.6 | good | good | INVENTIVE EXAMPLE 4 |
| 11 | SECOND ALUMINA, Fe OXIDE | 49 | 2.5 | 59 | poor | poor | COMPARATIVE EXAMPLE 7 |
| 12 | SECOND ALUMINA, Fe OXIDE | 33 | 4.3 | 38 | good | good | INVENTIVE EXAMPLE 5 |
| 13 | SECOND ALUMINA, Fe OXIDE | 23 | 6.9 | 27 | good | good | INVENTIVE EXAMPLE 6 |
| 14 | Fe OXIDE | 11 | 6.6 | 14 | good | good | INVENTIVE EXAMPLE 7 |
| 15 | Fe OXIDE | 9.2 | 12.0 | 1.4 | good | good | INVENTIVE EXAMPLE 8 |
| 16 | SECOND ALUMINA, Fe OXIDE | 53 | 2.7 | 60 | poor | poor | COMPARATIVE EXAMPLE 8 |
| 17 | SECOND ALUMINA, Fe OXIDE | 35 | 4.2 | 40 | good | good | INVENTIVE EXAMPLE 9 |
| 18 | SECOND ALUMINA, Fe OXIDE | 21 | 6.3 | 26 | good | good | INVENTIVE EXAMPLE 10 |
| 19 | Fe OXIDE | 12 | 7.2 | 14 | good | good | INVENTIVE EXAMPLE 11 |
| 20 | Fe OXIDE | 9.6 | 12.5 | 1.8 | good | good | INVENTIVE EXAMPLE 12 |
| 21 | | | | | poor | poor | COMPARATIVE EXAMPLE 9 |
| 22 | SECOND ALUMINA | 16 | 2.6 | UNDETECTABLE | poor | poor | COMPARATIVE EXAMPLE 10 |
| 23 | SECOND ALUMINA | 4.3 | 1.5 | UNDETECTABLE | poor | good | COMPARATIVE EXAMPLE 11 |
| 24 | UNAVAILABLE | 1.4 | 1.0 | UNDETECTABLE | poor | good | COMPARATIVE EXAMPLE 12 |
| 25 | UNAVAILABLE | 0.4 | 0.6 | UNDETECTABLE | poor | good | COMPARATIVE EXAMPLE 13 |
| 26 | SECOND ALUMINA, Fe OXIDE | 48 | 3.4 | 59 | poor | poor | COMPARATIVE EXAMPLE 14 |
| 27 | SECOND ALUMINA, Fe OXIDE | 34 | 5.4 | 39 | good | good | INVENTIVE EXAMPLE 13 |
| 28 | SECOND ALUMINA, Fe OXIDE | 21 | 7.8 | 26 | good | good | INVENTIVE EXAMPLE 14 |
| 29 | Fe OXIDE | 11 | 7.8 | 13 | good | good | INVENTIVE EXAMPLE 15 |
| 30 | Fe OXIDE | 7.1 | 11.5 | 4.3 | good | good | INVENTIVE EXAMPLE 16 |
| 31 | SECOND ALUMINA, Fe OXIDE | 48 | 3.4 | 58 | poor | poor | COMPARATIVE EXAMPLE 15 |
| 32 | SECOND ALUMINA, Fe OXIDE | 33 | 5.3 | 39 | good | good | INVENTIVE EXAMPLE 17 |
| 33 | SECOND ALUMINA, Fe OXIDE | 20 | 7.6 | 26 | good | good | INVENTIVE EXAMPLE 18 |
| 34 | Fe OXIDE | 12 | 8.6 | 15 | good | good | INVENTIVE EXAMPLE 19 |
| 35 | Fe OXIDE | 7.4 | 12.1 | 1.9 | good | good | INVENTIVE EXAMPLE 20 |
| 36 | SECOND ALUMINA, Fe OXIDE | 47 | 2.4 | 61 | poor | poor | COMPARATIVE EXAMPLE 16 |
| 37 | SECOND ALUMINA, Fe OXIDE | 34 | 5.1 | 39 | good | good | INVENTIVE EXAMPLE 21 |
| 38 | SECOND ALUMINA, Fe OXIDE | 23 | 10.4 | 27 | good | good | INVENTIVE EXAMPLE 22 |
| 39 | Fe OXIDE | 13 | 9.8 | 16 | good | good | INVENTIVE EXAMPLE 23 |
| 40 | Fe OXIDE | 7.1 | 11.4 | 2.8 | good | good | INVENTIVE EXAMPLE 24 |

TABLE 2-continued

| NO. | | | | | | | |
|---|---|---|---|---|---|---|---|
| 41 | | | | | poor | poor | COMPARATIVE EXAMPLE 17 |
| 42 | SECOND ALUMINA | 16 | 1.6 | UNDETECTABLE | poor | poor | COMPARATIVE EXAMPLE 18 |
| 43 | SECOND ALUMINA | 4.1 | 1.0 | UNDETECTABLE | poor | good | COMPARATIVE EXAMPLE 19 |
| 44 | UNAVAILABLE | 1.2 | 0.6 | UNDETECTABLE | poor | good | COMPARATIVE EXAMPLE 20 |
| 45 | UNAVAILABLE | 0.3 | 0.3 | UNDETECTABLE | poor | good | COMPARATIVE EXAMPLE 21 |
| 46 | SECOND ALUMINA, Fe OXIDE | 49 | 2.5 | 62 | poor | poor | COMPARATIVE EXAMPLE 22 |
| 47 | SECOND ALUMINA, Fe OXIDE | 34 | 4.1 | 40 | good | good | INVENTIVE EXAMPLE 25 |
| 48 | SECOND ALUMINA, Fe OXIDE | 24 | 5.8 | 28 | good | good | INVENTIVE EXAMPLE 26 |
| 49 | Fe OXIDE | 11 | 5.6 | 15 | good | good | INVENTIVE EXAMPLE 27 |
| 50 | Fe OXIDE | 7.2 | 8.1 | 6.0 | good | good | INVENTIVE EXAMPLE 28 |
| 51 | SECOND ALUMINA, Fe OXIDE | 47 | 2.4 | 61 | poor | poor | COMPARATIVE EXAMPLE 23 |
| 52 | SECOND ALUMINA, Fe OXIDE | 35 | 4.2 | 40 | good | good | INVENTIVE EXAMPLE 29 |
| 53 | SECOND ALUMINA, Fe OXIDE | 22 | 5.7 | 28 | good | good | INVENTIVE EXAMPLE 30 |
| 54 | Fe OXIDE | 10 | 5.2 | 16 | good | good | INVENTIVE EXAMPLE 31 |
| 55 | Fe OXIDE | 7.4 | 8.4 | 4.9 | good | good | INVENTIVE EXAMPLE 32 |
| 56 | SECOND ALUMINA, Fe OXIDE | 53 | 2.7 | 62 | poor | poor | COMPARATIVE EXAMPLE 24 |
| 57 | SECOND ALUMINA, Fe OXIDE | 35 | 4.6 | 39 | good | good | INVENTIVE EXAMPLE 33 |
| 58 | SECOND ALUMINA, Fe OXIDE | 21 | 5.7 | 28 | good | good | INVENTIVE EXAMPLE 34 |
| 59 | Fe OXIDE | 12 | 6.1 | 17 | good | good | INVENTIVE EXAMPLE 35 |
| 60 | Fe OXIDE | 7.2 | 8.3 | 3.7 | good | good | INVENTIVE EXAMPLE 36 |

TABLE 3

| | FOIL COMPONENT (INCLUDING OXIDE) | | | | | | |
|---|---|---|---|---|---|---|---|
| NO. | FOIL THICKNESS μm | Cr % by mass | Al % by mass | Fe % by mass | DOPED ELEMENT % by mass | UNAVOIDABLE IMPURITY % by mass | REMARKS |
| 61 | 30 | 20.1 | 5.6 | 72.9 | 0.1% Zr, 0.09% Hf | C, Si, Mn | COMPARATIVE EXAMPLE 25 |
| 62 | 30 | 20.1 | 5.6 | 72.9 | 0.1% Zr, 0.09% Hf | C, Si, Mn | COMPARATIVE EXAMPLE 26 |
| 63 | 30 | 20.1 | 5.6 | 72.9 | 0.1% Zr, 0.09% Hf | C, Si, Mn | COMPARATIVE EXAMPLE 27 |
| 64 | 30 | 20.1 | 5.6 | 72.9 | 0.1% Zr, 0.09% Hf | C, Si, Mn | COMPARATIVE EXAMPLE 28 |
| 65 | 30 | 20.1 | 5.6 | 72.9 | 0.1% Zr, 0.09% Hf | C, Si, Mn | COMPARATIVE EXAMPLE 29 |
| 66 | 30 | 20.1 | 5.6 | 72.9 | 0.1% Zr, 0.09% Hf | C, Si, Mn | COMPARATIVE EXAMPLE 30 |
| 67 | 30 | 20.1 | 5.6 | 72.9 | 0.1% Zr, 0.09% Hf | C, Si, Mn | INVENTIVE EXAMPLE 37 |
| 68 | 30 | 20.1 | 5.6 | 72.9 | 0.1% Zr, 0.09% Hf | C, Si, Mn | INVENTIVE EXAMPLE 38 |
| 69 | 30 | 20.1 | 5.6 | 72.9 | 0.1% Zr, 0.09% Hf | C, Si, Mn | INVENTIVE EXAMPLE 39 |

TABLE 3-continued

| | | FOIL COMPONENT (INCLUDING OXIDE) | | | | | |
|---|---|---|---|---|---|---|---|
| NO. | FOIL THICK- NESS μm | Cr % by mass | Al % by mass | Fe % by mass | DOPED ELEMENT % by mass | UNAVOID- ABLE IMPURITY % by mass | REMARKS |
| 70 | 30 | 20.1 | 5.6 | 72.9 | 0.1% Zr, 0.09% Hf | C, Si, Mn | INVENTIVE EXAMPLE 40 |
| 71 | 30 | 20.1 | 5.6 | 72.9 | 0.1% Zr, 0.09% Hf | C, Si, Mn | COMPARATIVE EXAMPLE 31 |
| 72 | 30 | 20.1 | 5.6 | 72.9 | 0.1% Zr, 0.09% Hf | C, Si, Mn | INVENTIVE EXAMPLE 41 |
| 73 | 30 | 20.1 | 5.6 | 72.9 | 0.1% Zr, 0.09% Hf | C, Si, Mn | INVENTIVE EXAMPLE 42 |
| 74 | 30 | 20.1 | 5.6 | 72.9 | 0.1% Zr, 0.09% Hf | C, Si, Mn | INVENTIVE EXAMPLE 43 |
| 75 | 30 | 20.1 | 5.6 | 72.9 | 0.1% Zr, 0.09% Hf | C, Si, Mn | INVENTIVE EXAMPLE 44 |
| 76 | 30 | 20.1 | 5.6 | 72.9 | 0.1% Zr, 0.09% Hf | C, Si, Mn | COMPARATIVE EXAMPLE 32 |
| 77 | 30 | 20.1 | 5.6 | 72.9 | 0.1% Zr, 0.09% Hf | C, Si, Mn | INVENTIVE EXAMPLE 45 |
| 78 | 30 | 20.1 | 5.6 | 72.9 | 0.1% Zr, 0.09% Hf | C, Si, Mn | INVENTIVE EXAMPLE 46 |
| 79 | 30 | 20.1 | 5.6 | 72.9 | 0.1% Zr, 0.09% Hf | C, Si, Mn | INVENTIVE EXAMPLE 47 |
| 80 | 30 | 20.1 | 5.6 | 72.9 | 0.1% Zr, 0.09% Hf | C, Si, Mn | INVENTIVE EXAMPLE 48 |
| 81 | 20 | 19.8 | 7.5 | 71.3 | 0.08% Ti, 0.08% REM | C, Si, Mn | COMPARATIVE EXAMPLE 33 |
| 82 | 20 | 19.8 | 7.5 | 71.3 | 0.08% Ti, 0.08% REM | C, Si, Mn | COMPARATIVE EXAMPLE 34 |
| 83 | 20 | 19.8 | 7.5 | 71.3 | 0.08% Ti, 0.08% REM | C, Si, Mn | COMPARATIVE EXAMPLE 35 |
| 84 | 20 | 19.8 | 7.5 | 71.3 | 0.08% Ti, 0.08% REM | C, Si, Mn | COMPARATIVE EXAMPLE 36 |
| 85 | 20 | 19.8 | 7.5 | 71.3 | 0.08% Ti, 0.08% REM | C, Si, Mn | COMPARATIVE EXAMPLE 37 |
| 86 | 20 | 19.8 | 7.5 | 71.3 | 0.08% Ti, 0.08% REM | C, Si, Mn | COMPARATIVE EXAMPLE 38 |
| 87 | 20 | 19.8 | 7.5 | 71.3 | 0.08% Ti, 0.08% REM | C, Si, Mn | INVENTIVE EXAMPLE 49 |
| 88 | 20 | 19.8 | 7.5 | 71.3 | 0.08% Ti, 0.08% REM | C, Si, Mn | INVENTIVE EXAMPLE 50 |
| 89 | 20 | 19.8 | 7.5 | 71.3 | 0.08% Ti, 0.08% REM | C, Si, Mn | INVENTIVE EXAMPLE 51 |
| 90 | 20 | 19.8 | 7.5 | 71.3 | 0.08% Ti, 0.08% REM | C, Si, Mn | INVENTIVE EXAMPLE 52 |
| 91 | 20 | 19.8 | 7.5 | 71.3 | 0.08% Ti, 0.08% REM | C, Si, Mn | COMPARATIVE EXAMPLE 39 |
| 92 | 20 | 19.8 | 7.5 | 71.3 | 0.08% Ti, 0.08% REM | C, Si, Mn | INVENTIVE EXAMPLE 53 |
| 93 | 20 | 19.8 | 7.5 | 71.3 | 0.08% Ti, 0.08% REM | C, Si, Mn | INVENTIVE EXAMPLE 54 |
| 94 | 20 | 19.8 | 7.5 | 71.3 | 0.08% Ti, 0.08% REM | C, Si, Mn | INVENTIVE EXAMPLE 55 |
| 95 | 20 | 19.8 | 7.5 | 71.3 | 0.08% Ti, 0.08% REM | C, Si, Mn | INVENTIVE EXAMPLE 56 |
| 96 | 20 | 19.8 | 7.5 | 71.3 | 0.08% Ti, 0.08% REM | C, Si, Mn | COMPARATIVE EXAMPLE 40 |
| 97 | 20 | 19.8 | 7.5 | 71.3 | 0.08% Ti, 0.08% REM | C, Si, Mn | INVENTIVE EXAMPLE 57 |
| 98 | 20 | 19.8 | 7.5 | 71.3 | 0.08% Ti, 0.08% REM | C, Si, Mn | INVENTIVE EXAMPLE 58 |
| 99 | 20 | 19.8 | 7.5 | 71.3 | 0.08% Ti, 0.08% REM | C, Si, Mn | INVENTIVE EXAMPLE 59 |
| 100 | 20 | 19.8 | 7.5 | 71.3 | 0.08% Ti, 0.08% REM | C, Si, Mn | INVENTIVE EXAMPLE 60 |
| 101 | 50 | 18.1 | 3.2 | 77.9 | 0.08% Zr 0.10% La | C, Si, Mn | COMPARATIVE EXAMPLE 41 |
| 102 | 50 | 18.1 | 3.2 | 77.9 | 0.08% Zr 0.10% La | C, Si, Mn | COMPARATIVE EXAMPLE 42 |
| 103 | 50 | 18.1 | 3.2 | 77.9 | 0.08% Zr 0.10% La | C, Si, Mn | COMPARATIVE EXAMPLE 43 |
| 104 | 50 | 18.1 | 3.2 | 77.9 | 0.08% Zr 0.10% La | C, Si, Mn | COMPARATIVE EXAMPLE 44 |
| 105 | 50 | 18.1 | 3.2 | 77.9 | 0.08% Zr 0.10% La | C, Si, Mn | COMPARATIVE EXAMPLE 45 |

TABLE 3-continued

| | FOIL COMPONENT (INCLUDING OXIDE) | | | | | | |
|---|---|---|---|---|---|---|---|
| NO. | FOIL THICK- NESS μm | Cr % by mass | Al % by mass | Fe % by mass | DOPED ELEMENT % by mass | UNAVOID- ABLE IMPURITY % by mass | REMARKS |
| 106 | 50 | 18.1 | 3.2 | 77.9 | 0.08% Zr 0.10% La | C, Si, Mn | COMPARATIVE EXAMPLE 46 |
| 107 | 50 | 18.1 | 3.2 | 77.9 | 0.08% Zr 0.10% La | C, Si, Mn | INVENTIVE EXAMPLE 61 |
| 108 | 50 | 18.1 | 3.2 | 77.9 | 0.08% Zr 0.10% La | C, Si, Mn | INVENTIVE EXAMPLE 62 |
| 109 | 50 | 18.1 | 3.2 | 77.9 | 0.08% Zr 0.10% La | C, Si, Mn | INVENTIVE EXAMPLE 63 |
| 110 | 50 | 18.1 | 3.2 | 77.9 | 0.08% Zr 0.10% La | C, Si, Mn | INVENTIVE EXAMPLE 64 |
| 111 | 50 | 18.1 | 3.2 | 77.9 | 0.08% Zr 0.10% La | C, Si, Mn | COMPARATIVE EXAMPLE 47 |
| 112 | 50 | 18.1 | 3.2 | 77.9 | 0.08% Zr 0.10% La | C, Si, Mn | INVENTIVE EXAMPLE 65 |
| 113 | 50 | 18.1 | 3.2 | 77.9 | 0.08% Zr 0.10% La | C, Si, Mn | INVENTIVE EXAMPLE 66 |
| 114 | 50 | 18.1 | 3.2 | 77.9 | 0.08% Zr 0.10% La | C, Si, Mn | INVENTIVE EXAMPLE 67 |
| 115 | 50 | 18.1 | 3.2 | 77.9 | 0.08% Zr 0.10% La | C, Si, Mn | INVENTIVE EXAMPLE 68 |
| 116 | 50 | 18.1 | 3.2 | 77.9 | 0.08% Zr 0.10% La | C, Si, Mn | COMPARATIVE EXAMPLE 48 |
| 117 | 50 | 18.1 | 3.2 | 77.9 | 0.08% Zr 0.10% La | C, Si, Mn | INVENTIVE EXAMPLE 69 |
| 118 | 50 | 18.1 | 3.2 | 77.9 | 0.08% Zr 0.10% La | C, Si, Mn | INVENTIVE EXAMPLE 70 |
| 119 | 50 | 18.1 | 3.2 | 77.9 | 0.08% Zr 0.10% La | C, Si, Mn | INVENTIVE EXAMPLE 71 |
| 120 | 50 | 18.1 | 3.2 | 77.9 | 0.08% Zr 0.10% La | C, Si, Mn | INVENTIVE EXAMPLE 72 |

TABLE 4

| | HEAT TREATMENT | | | | WATER VAPOR | | END SURFACE ON INLET SIDE TO 2 mm REGION | |
|---|---|---|---|---|---|---|---|---|
| NO. | TEMPER- ATURE °C. | TIME h | ENVIRON- MENT | SV VALUE h$^{-1}$ | DEW POINT °C. | OFFSET | THICKNESS μm | α- ALUMINA % by mass |
| 61 | UNAVAILABLE | | | | — | AVAILABLE | UNAVAIL- ABLE | 0 |
| 62 | 800 | 2 | ATMOSPHERE | 0 | 20 | AVAILABLE | 0.11 | 27 |
| 63 | 900 | 2 | ATMOSPHERE | 0 | 20 | AVAILABLE | 0.32 | 58 |
| 64 | 1000 | 2 | ATMOSPHERE | 0 | 20 | AVAILABLE | 0.59 | 82 |
| 65 | 1100 | 2 | ATMOSPHERE | 0 | 20 | AVAILABLE | 1.29 | 99.8 |
| 66 | 700 | 2 | ATMOSPHERE | 0.1 | 35 | AVAILABLE | 0.06 | 21 |
| 67 | 800 | 2 | ATMOSPHERE | 0.1 | 35 | AVAILABLE | 0.13 | 32 |
| 68 | 900 | 2 | ATMOSPHERE | 0.1 | 35 | AVAILABLE | 0.31 | 58 |
| 69 | 1000 | 2 | ATMOSPHERE | 0.1 | 35 | AVAILABLE | 0.59 | 83 |
| 70 | 1100 | 2 | ATMOSPHERE | 0.1 | 35 | AVAILABLE | 1.31 | 99.5 |
| 71 | 700 | 2 | ATMOSPHERE | 1 | 35 | AVAILABLE | 0.06 | 24 |
| 72 | 800 | 2 | ATMOSPHERE | 1 | 35 | AVAILABLE | 0.12 | 31 |
| 73 | 900 | 2 | ATMOSPHERE | 1 | 35 | AVAILABLE | 0.32 | 59 |
| 74 | 1000 | 2 | ATMOSPHERE | 1 | 35 | AVAILABLE | 0.61 | 85 |
| 75 | 1100 | 2 | ATMOSPHERE | 1 | 35 | AVAILABLE | 1.29 | 96.7 |
| 76 | 700 | 2 | ATMOSPHERE | 10 | 35 | AVAILABLE | 0.06 | 23 |
| 77 | 800 | 2 | ATMOSPHERE | 10 | 35 | AVAILABLE | 0.13 | 32 |
| 78 | 900 | 2 | ATMOSPHERE | 10 | 35 | AVAILABLE | 0.31 | 56 |
| 79 | 1000 | 2 | ATMOSPHERE | 10 | 35 | AVAILABLE | 0.62 | 85 |
| 80 | 1100 | 2 | ATMOSPHERE | 10 | 35 | AVAILABLE | 1.34 | 99.3 |
| 81 | UNAVAILABLE | | | | — | AVAILABLE | UNAVAIL- ABLE | 0 |
| 82 | 800 | 0.5 | ATMOSPHERE | 0 | 10 | AVAILABLE | 0.11 | 28 |
| 83 | 900 | 0.5 | ATMOSPHERE | 0 | 10 | AVAILABLE | 0.25 | 59 |
| 84 | 1000 | 0.5 | ATMOSPHERE | 0 | 10 | AVAILABLE | 0.52 | 76 |
| 85 | 1100 | 0.5 | ATMOSPHERE | 0 | 10 | AVAILABLE | 1.11 | 99.2 |
| 86 | 700 | 0.5 | ATMOSPHERE | 0.1 | 45 | AVAILABLE | 0.04 | 23 |

TABLE 4-continued

| NO. | | | | | | | | |
|---|---|---|---|---|---|---|---|---|
| 87 | 800 | 0.5 | ATMOSPHERE | 0.1 | 45 | AVAILABLE | 0.12 | 34 |
| 88 | 900 | 0.5 | ATMOSPHERE | 0.1 | 45 | AVAILABLE | 0.25 | 57 |
| 89 | 1000 | 0.5 | ATMOSPHERE | 0.1 | 45 | AVAILABLE | 0.51 | 84 |
| 90 | 1100 | 0.5 | ATMOSPHERE | 0.1 | 45 | AVAILABLE | 1.11 | 98.2 |
| 91 | 700 | 0.5 | ATMOSPHERE | 1 | 45 | AVAILABLE | 0.04 | 20 |
| 92 | 800 | 0.5 | ATMOSPHERE | 1 | 45 | AVAILABLE | 0.12 | 31 |
| 93 | 900 | 0.5 | ATMOSPHERE | 1 | 45 | AVAILABLE | 0.25 | 59 |
| 94 | 1000 | 0.5 | ATMOSPHERE | 1 | 45 | AVAILABLE | 0.51 | 87 |
| 95 | 1100 | 0.5 | ATMOSPHERE | 1 | 45 | AVAILABLE | 1.12 | 97.7 |
| 96 | 700 | 0.5 | ATMOSPHERE | 10 | 45 | AVAILABLE | 0.04 | 23 |
| 97 | 800 | 0.5 | ATMOSPHERE | 10 | 45 | AVAILABLE | 0.13 | 36 |
| 98 | 900 | 0.5 | ATMOSPHERE | 10 | 45 | AVAILABLE | 0.26 | 61 |
| 99 | 1000 | 0.5 | ATMOSPHERE | 10 | 45 | AVAILABLE | 0.52 | 86 |
| 100 | 1100 | 0.5 | ATMOSPHERE | 10 | 45 | AVAILABLE | 1.14 | 95.4 |
| 101 | | UNAVAILABLE | | | — | AVAILABLE | UNAVAIL-ABLE | 0 |
| 102 | 800 | 4 | ATMOSPHERE | 0 | 5 | AVAILABLE | 0.17 | 29 |
| 103 | 900 | 4 | ATMOSPHERE | 0 | 5 | AVAILABLE | 0.36 | 58 |
| 104 | 1000 | 4 | ATMOSPHERE | 0 | 5 | AVAILABLE | 0.69 | 79 |
| 105 | 1100 | 4 | ATMOSPHERE | 0 | 5 | AVAILABLE | 1.59 | 93 |
| 106 | 700 | 4 | ATMOSPHERE | 0.1 | 58 | AVAILABLE | 0.07 | 17 |
| 107 | 800 | 4 | ATMOSPHERE | 0.1 | 58 | AVAILABLE | 0.17 | 31 |
| 108 | 900 | 4 | ATMOSPHERE | 0.1 | 58 | AVAILABLE | 0.37 | 54 |
| 109 | 1000 | 4 | ATMOSPHERE | 0.1 | 58 | AVAILABLE | 0.72 | 84 |
| 110 | 1100 | 4 | ATMOSPHERE | 0.1 | 58 | AVAILABLE | 1.63 | 94.1 |
| 111 | 700 | 4 | ATMOSPHERE | 1 | 58 | AVAILABLE | 0.07 | 17 |
| 112 | 800 | 4 | ATMOSPHERE | 1 | 58 | AVAILABLE | 0.17 | 32 |
| 113 | 900 | 4 | ATMOSPHERE | 1 | 58 | AVAILABLE | 0.38 | 56 |
| 114 | 1000 | 4 | ATMOSPHERE | 1 | 58 | AVAILABLE | 0.72 | 83 |
| 115 | 1100 | 4 | ATMOSPHERE | 1 | 58 | AVAILABLE | 1.64 | 94.3 |
| 116 | 700 | 4 | ATMOSPHERE | 10 | 58 | AVAILABLE | 0.07 | 20 |
| 117 | 800 | 4 | ATMOSPHERE | 10 | 58 | AVAILABLE | 0.17 | 36 |
| 118 | 900 | 4 | ATMOSPHERE | 10 | 58 | AVAILABLE | 0.41 | 61 |
| 119 | 1000 | 4 | ATMOSPHERE | 10 | 58 | AVAILABLE | 0.75 | 84 |
| 120 | 1100 | 4 | ATMOSPHERE | 10 | 58 | AVAILABLE | 1.63 | 96.2 |

| | END SURFACE ON INLET SIDE TO 2 mm REGION | | | EVALUATION | | |
|---|---|---|---|---|---|---|
| NO. | REMAINDER TYPE | Fe CONTENT % by mass | THICKNESS × Fe CONTENT | Fe OXIDE % by mass | WIND EROSION | PURIFICATION PERFORMANCE | REMARKS |
| 61 | | | | | poor | poor | COMPARATIVE EXAMPLE 25 |
| 62 | SECOND ALUMINA | 14 | 1.5 | UNDETECTABLE | poor | poor | COMPARATIVE EXAMPLE 26 |
| 63 | SECOND ALUMINA | 6.1 | 2.0 | UNDETECTABLE | poor | good | COMPARATIVE EXAMPLE 27 |
| 64 | UNAVAILABLE | 1.3 | 0.8 | UNDETECTABLE | poor | good | COMPARATIVE EXAMPLE 28 |
| 65 | UNAVAILABLE | 0.3 | 0.4 | UNDETECTABLE | poor | good | COMPARATIVE EXAMPLE 29 |
| 66 | SECOND ALUMINA, Fe OXIDE | 46 | 2.8 | 63 | poor | poor | COMPARATIVE EXAMPLE 30 |
| 67 | SECOND ALUMINA, Fe OXIDE | 35 | 4.6 | 39 | good | good | INVENTIVE EXAMPLE 37 |
| 68 | SECOND ALUMINA, Fe OXIDE | 22 | 6.8 | 24 | good | good | INVENTIVE EXAMPLE 38 |
| 69 | Fe OXIDE | 13 | 7.7 | 17 | good | good | INVENTIVE EXAMPLE 39 |
| 70 | Fe OXIDE | 7.9 | 10.3 | 0.5 | good | good | INVENTIVE EXAMPLE 40 |
| 71 | SECOND ALUMINA, Fe OXIDE | 47 | 2.8 | 59 | poor | poor | COMPARATIVE EXAMPLE 31 |
| 72 | SECOND ALUMINA, Fe OXIDE | 34 | 4.1 | 39 | good | good | INVENTIVE EXAMPLE 41 |
| 73 | SECOND ALUMINA, Fe OXIDE | 21 | 6.7 | 28 | good | good | INVENTIVE EXAMPLE 42 |
| 74 | Fe OXIDE | 12 | 7.3 | 15 | good | good | INVENTIVE EXAMPLE 43 |
| 75 | Fe OXIDE | 7.1 | 9.2 | 2.3 | good | good | INVENTIVE EXAMPLE 44 |

TABLE 4-continued

| | | | | | | | |
|---|---|---|---|---|---|---|---|
| 76 | SECOND ALUMINA, Fe OXIDE | 48 | 2.9 | 62 | poor | poor | COMPARATIVE EXAMPLE 32 |
| 77 | SECOND ALUMINA, Fe OXIDE | 33 | 4.3 | 39 | good | good | INVENTIVE EXAMPLE 45 |
| 78 | SECOND ALUMINA, Fe OXIDE | 21 | 6.5 | 27 | good | good | INVENTIVE EXAMPLE 46 |
| 79 | Fe OXIDE | 13 | 8.1 | 15 | good | good | INVENTIVE EXAMPLE 47 |
| 80 | Fe OXIDE | 7.4 | 9.9 | 0.7 | good | good | INVENTIVE EXAMPLE 48 |
| 81 | | | | | poor | poor | COMPARATIVE EXAMPLE 33 |
| 82 | SECOND ALUMINA | 14 | 1.5 | UNDETECTABLE | poor | poor | COMPARATIVE EXAMPLE 34 |
| 83 | SECOND ALUMINA | 4.7 | 1.2 | UNDETECTABLE | poor | good | COMPARATIVE EXAMPLE 35 |
| 84 | UNAVAILABLE | 1.6 | 0.8 | UNDETECTABLE | poor | good | COMPARATIVE EXAMPLE 36 |
| 85 | UNAVAILABLE | 0.5 | 0.6 | UNDETECTABLE | poor | good | COMPARATIVE EXAMPLE 37 |
| 86 | SECOND ALUMINA, Fe OXIDE | 49 | 2.0 | 59 | poor | poor | COMPARATIVE EXAMPLE 38 |
| 87 | SECOND ALUMINA, Fe OXIDE | 34 | 4.1 | 39 | good | good | INVENTIVE EXAMPLE 49 |
| 88 | SECOND ALUMINA, Fe OXIDE | 21 | 5.3 | 26 | good | good | INVENTIVE EXAMPLE 50 |
| 89 | Fe OXIDE | 12 | 6.1 | 16 | good | good | INVENTIVE EXAMPLE 51 |
| 90 | Fe OXIDE | 7.5 | 8.3 | 2.7 | good | good | INVENTIVE EXAMPLE 52 |
| 91 | SECOND ALUMINA, Fe OXIDE | 45 | 1.8 | 58 | poor | poor | COMPARATIVE EXAMPLE 39 |
| 92 | SECOND ALUMINA, Fe OXIDE | 34 | 4.1 | 40 | good | good | INVENTIVE EXAMPLE 53 |
| 93 | SECOND ALUMINA, Fe OXIDE | 23 | 5.8 | 26 | good | good | INVENTIVE EXAMPLE 54 |
| 94 | Fe OXIDE | 12 | 6.1 | 13 | good | good | INVENTIVE EXAMPLE 55 |
| 95 | Fe OXIDE | 7.1 | 8.0 | 2.3 | good | good | INVENTIVE EXAMPLE 56 |
| 96 | SECOND ALUMINA, Fe OXIDE | 47 | 1.9 | 58 | poor | poor | COMPARATIVE EXAMPLE 40 |
| 97 | SECOND ALUMINA, Fe OXIDE | 35 | 4.6 | 37 | good | good | INVENTIVE EXAMPLE 57 |
| 98 | SECOND ALUMINA, Fe OXIDE | 28 | 7.3 | 29 | good | good | INVENTIVE EXAMPLE 58 |
| 99 | Fe OXIDE | 13 | 6.8 | 14 | good | good | INVENTIVE EXAMPLE 59 |
| 100 | Fe OXIDE | 8.3 | 9.5 | 4.6 | good | good | INVENTIVE EXAMPLE 60 |
| 101 | | | | | poor | poor | COMPARATIVE EXAMPLE 41 |
| 102 | SECOND ALUMINA | 15 | 2.6 | UNDETECTABLE | poor | poor | COMPARATIVE EXAMPLE 42 |
| 103 | SECOND ALUMINA | 4.9 | 1.8 | UNDETECTABLE | poor | good | COMPARATIVE EXAMPLE 43 |
| 104 | UNAVAILABLE | 1.6 | 1.1 | UNDETECTABLE | poor | good | COMPARATIVE EXAMPLE 44 |
| 105 | UNAVAILABLE | 0.5 | 0.8 | UNDETECTABLE | poor | good | COMPARATIVE EXAMPLE 45 |
| 106 | SECOND ALUMINA, Fe OXIDE | 48 | 3.4 | 61 | poor | poor | COMPARATIVE EXAMPLE 46 |
| 107 | SECOND ALUMINA, Fe OXIDE | 34 | 5.8 | 38 | good | good | INVENTIVE EXAMPLE 61 |

TABLE 4-continued

| | | | | | | | |
|---|---|---|---|---|---|---|---|
| 108 | SECOND ALUMINA, Fe OXIDE | 24 | 8.9 | 27 | good | good | INVENTIVE EXAMPLE 62 |
| 109 | Fe OXIDE | 13 | 9.4 | 16 | good | good | INVENTIVE EXAMPLE 63 |
| 110 | Fe OXIDE | 7.1 | 11.6 | 5.9 | good | good | INVENTIVE EXAMPLE 64 |
| 111 | SECOND ALUMINA, Fe OXIDE | 47 | 3.3 | 63 | poor | poor | COMPARATIVE EXAMPLE 47 |
| 112 | SECOND ALUMINA, Fe OXIDE | 33 | 5.6 | 40 | good | good | INVENTIVE EXAMPLE 65 |
| 113 | SECOND ALUMINA, Fe OXIDE | 19 | 7.2 | 25 | good | good | INVENTIVE EXAMPLE 66 |
| 114 | Fe OXIDE | 11 | 7.9 | 17 | good | good | INVENTIVE EXAMPLE 67 |
| 115 | Fe OXIDE | 7.2 | 11.8 | 5.7 | good | good | INVENTIVE EXAMPLE 68 |
| 116 | SECOND ALUMINA, Fe OXIDE | 48 | 3.4 | 61 | poor | poor | COMPARATIVE EXAMPLE 48 |
| 117 | SECOND ALUMINA, Fe OXIDE | 34 | 5.8 | 40 | good | good | INVENTIVE EXAMPLE 69 |
| 118 | SECOND ALUMINA, Fe OXIDE | 25 | 10.3 | 27 | good | good | INVENTIVE EXAMPLE 70 |
| 119 | Fe OXIDE | 13 | 9.8 | 16 | good | good | INVENTIVE EXAMPLE 71 |
| 120 | Fe OXIDE | 7.1 | 11.6 | 3.8 | good | good | INVENTIVE EXAMPLE 72 |

In Comparative Examples 1, 9, 17, 25, 33, and 41, since no heat treatment was performed, no oxide film was formed. In Comparative Examples 2, 10, 18, 26, 34, and 42, since the content of α-alumina contained in the oxide film was low, the wind erosion resistance was evaluated as "poor". On the other hand, in Comparative Examples 2, 10, 18, 26, 34, and 42, the concentration of Fe contained in the oxide film was high; however, no Fe oxide was detected, and thus the purification performance was evaluated as "poor".

In Comparative Examples 3 to 5, 11 to 13, 19 to 21, 27 to 29, 35 to 37, and 43 to 45, the concentration of Fe contained in the oxide film was low, and thus the wind erosion resistance was evaluated as "poor". In Comparative Examples 6 to 8, 14 to 16, 22 to 24, 30 to 32, 38 to 40, and 46 to 48, the oxide film contained too much Fe oxide and thus the content of α-alumina was low. Thus, the wind erosion resistance was evaluated as "poor". On the other hand, in Comparative Examples 6 to 8, 14 to 16, 22 to 24, 30 to 32, 38 to 40, and 46 to 48, the content of Fe contained in the oxide film was high, and thus the purification performance was evaluated as "poor".

MODIFIED EXAMPLE 1

In the aforementioned embodiment, the brazing process in step S3 was performed and thereafter the special heat treatment in step S4 was performed. However, the present invention is not limited thereto. It may also be accepted before step S4 to calcinate a stainless foil in a vacuum at an oxygen partial pressure of about $10^{-2}$ Pa or in a reduction atmosphere of hydrogen or carbon monoxide or the like and thereby prepare the surface condition of the stainless foil before the special heat treatment. This may enable efficiently providing the aforementioned oxide film.

MODIFIED EXAMPLE 2

Figure 5:
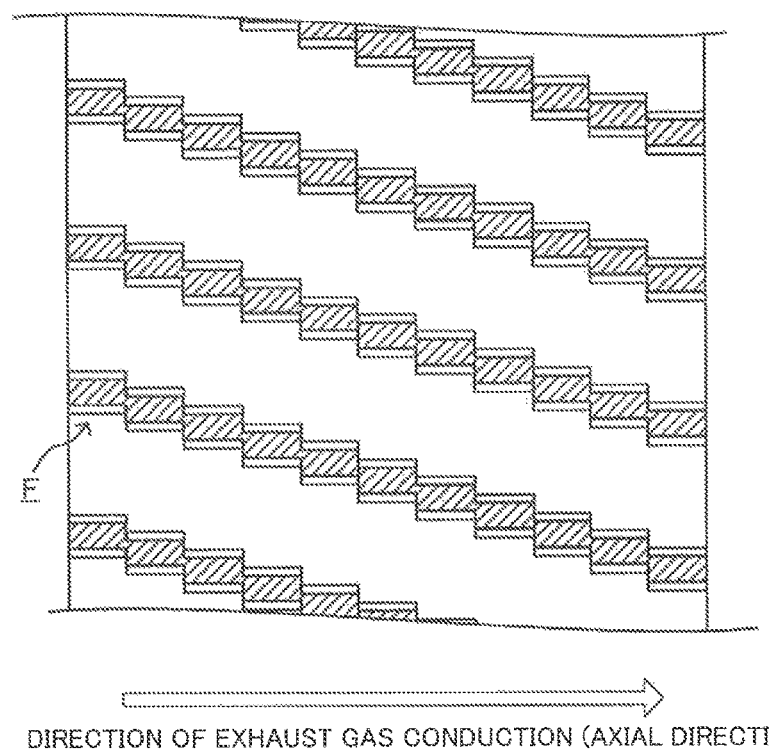
FIG. 5 is a view illustrating a modified example of an offset structure with fins arranged in an inclined direction.
Figure 6:
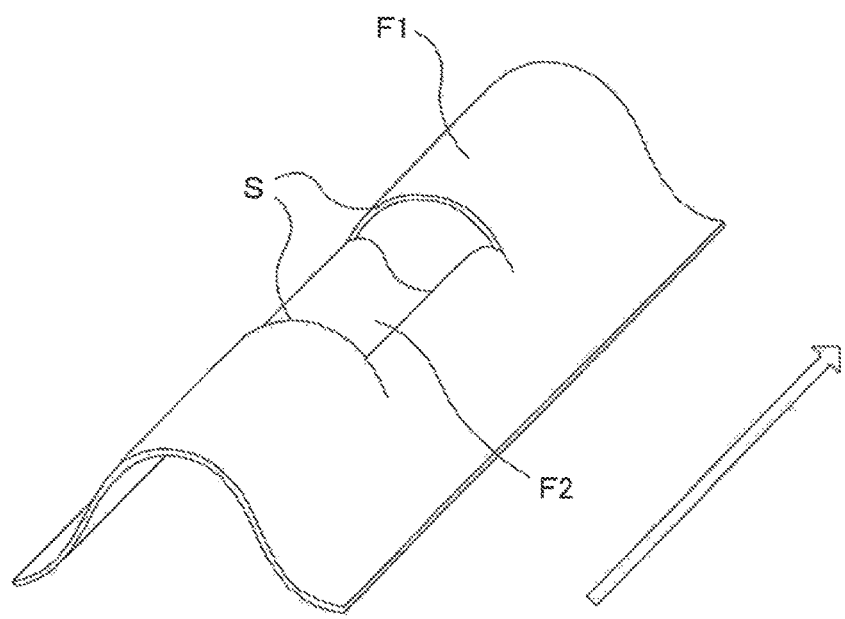
FIG. 6 is a view illustrating a modified example of an offset structure with part of the corrugated foil bent downwardly.

In the aforementioned embodiment, respective fins F were disposed in a staggered arrangement. However, the present invention is not limited thereto. Another structure may also be accepted so long as the structure is provided with an offset structure in which adjacent waves have different phases in the axial direction. For example, as illustrated in FIG. 5, the present invention can also be applied to the corrugated foil that has an offset structure in which fins F are arranged side by side in an inclined direction that is inclined relative to the axial direction. In this case, it is possible to form an oxide film that has an outstanding wind erosion resistance on the end surface on the gas inlet side of each fin F (equivalent to the exposed end surface). Furthermore, the present invention can also be applied to the corrugated foil illustrated in FIG. 6. That is, the present invention can also be applied to the offset structure in which a pair of slits S is formed on the corrugated foil and a region sandwiched between the pair of slits S is pushed downwardly, thereby forming a fin F1 protruded upwardly and a fin F2 protruded downwardly. In this case, it is possible to form an oxide film having an outstanding wind erosion resistance on the end surface on the gas inlet side of the fin F1 and the end surface on the gas inlet side of the fin F2.

MODIFIED EXAMPLE 3

In the aforementioned embodiment, such an example was described in which the catalyst carrier 1 was used in a purification device for purifying a diesel exhaust gas. However, the present invention is not limited thereto, and may also be applied to a purification device for purifying an exhaust gas resulting from the combustion of gasoline.

MODIFIED EXAMPLE 4

The flat foil 40 maybe provided intermittently with a plurality of openings. An exhaust gas having flown into each flow path of the honeycomb core 10 passes through each opening and is then branched into another radially adjacent flow path. This causes turbulent flows to readily occur and thus enhances the purification performance of the exhaust gas. It is also possible to form the oxide film of the present invention mainly on the downstream edges of the openings by the gas passing through each opening when the special heat treatment is performed.

REFERENCE SIGNS LIST 1 catalyst carrier
10 honeycomb core
20 outer jacket
30 corrugated foil
40 flat foil
F fin

The invention claimed is:

1. A metal substrate for catalytic converter for purifying an exhaust gas, comprising a honeycomb core with metal flat foil and corrugated foil stacked in layers, wherein
an oxide film having a thickness of 0.1 μm or more and 10 μm or less is formed in a predetermined range including an exposed end ina comprising α-alumina and a Fe oxide;
the α-alumina contains α-alumina with solid-solved Fe and α-alumina with no solid-solved Fe;
in the oxide film, a content of the first alumina is 30% by mass or more and 99.5% by mass or less, a content of the Fe oxide is 0.5% by mass or more and 40% by mass or less, and a content of Fe is more than 7% by mass and 35% by mass or less; and
the predetermined range is at least 2 mm from the exposed end surface in a direction in which a gas flows.

2. The metal substrate for catalytic converter according to claim 1, wherein the oxide film further contains at least one type of a second alumina and a Cr oxide, and the second alumina comprises at least one or more types of γ, θ, χ, δ, η, and κ aluminas.

3. The metal substrate for catalytic converter according to claim 1, wherein, when T (μm) represents a thickness of the oxide film and G (% by mass) represents the content of Fe in the oxide film, a product of T (μm) and G (% by mass) is more than 4.0 and 20.0 or less.

4. The metal substrate for catalytic converter according to claim 1, wherein
the corrugated foil has an offset part having mutually different phases between adjacent waves in the axial direction of the honeycomb core, and
the oxide film in the predetermined range is formed in the offset part.

5. The metal substrate for catalytic converter according to claim 1, wherein the corrugated foil is a stainless foil and contains at least Fe, Cr, and Al, and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

6. A catalyst carrier comprising:
the metal substrate for catalytic converter according to claim 1; and
a catalyst carried on the flat foil and the corrugated foil.

7. The catalyst carrier according to claim 6, being used in a purification device for purifying a diesel exhaust gas.

8. The catalyst carrier according to claim 6, being used in a purification device for purifying an exhaust gas resulting from combustion of gasoline.

9. The metal substrate for catalytic converter according to claim 2, wherein, when T (μm) represents a thickness of the oxide film and G (% by mass) represents the content of Fe in the oxide film, a product of T (μm) and G (% by mass) is more than 4.0 and 20.0 or less.

10. The metal substrate for catalytic converter according to claim 2, wherein
the corrugated foil has an offset part having mutually different phases between adjacent waves in the axial direction of the honeycomb core, and
the oxide film in the predetermined range is formed in the offset part.

11. The metal substrate for catalytic converter according to claim 3, wherein
the corrugated foil has an offset part having mutually different phases between adjacent waves in the axial direction of the honeycomb core, and
the oxide film in the predetermined range is formed in the offset part.

12. The metal substrate for catalytic converter according to claim 9, wherein
the corrugated foil has an offset part having mutually different phases between adjacent waves in the axial direction of the honeycomb core, and
the oxide film in the predetermined range is formed in the offset part.

13. The metal substrate for catalytic converter according to claim 2, wherein the corrugated foil is a stainless foil and contains at least Fe, Cr, and Al, and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

14. The metal substrate for catalytic converter according to claim 3, wherein the corrugated foil is a stainless foil and contains at least Fe, Cr, and Al, and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

15. The metal substrate for catalytic converter according to claim 4, wherein the corrugated foil is a stainless foil and contains at least Fe, Cr, and Al, and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

16. The metal substrate for catalytic converter according to claim 9, wherein the corrugated foil is a stainless foil and contains at least Fe, Cr, and Al, and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

17. The metal substrate for catalytic converter according to claim 10, wherein the corrugated foil is a stainless foil and contains at least Fe, Cr, and Al, and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

18. The metal substrate for catalytic converter according to claim 11, wherein the corrugated foil is a stainless foil and contains at least Fe, Cr, and Al, and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

19. The metal substrate for catalytic converter according to claim 12, wherein the corrugated foil is a stainless foil and contains at least Fe, Cr, and Al, and the corrugated foil and the oxide film formed on the corrugated foil contain 60% by mass or more and 85% by mass or less of Fe, 9% by mass or more and 30% by mass or less of Cr, and 1.5% by mass or more and 13% by mass or less of Al.

20. A catalyst carrier comprising:
    the metal substrate for catalytic converter according to claim 2; and
    a catalyst carried on the flat foil and the corrugated foil.

* * * * *